Nov. 12, 1968

C. R. DAVIES 3,410,966

SYSTEM FOR REMOTE TESTING OF TELEPHONE SUBSCRIBERS' LINES

Filed May 27, 1965

LOCKOUT SELECTOR

TIMER

FIG. 9 MULTIFREQUENCY CODE GENERATOR

1017 CYCLE RECEIVER

VARIABLE FREQUENCY RECEIVER

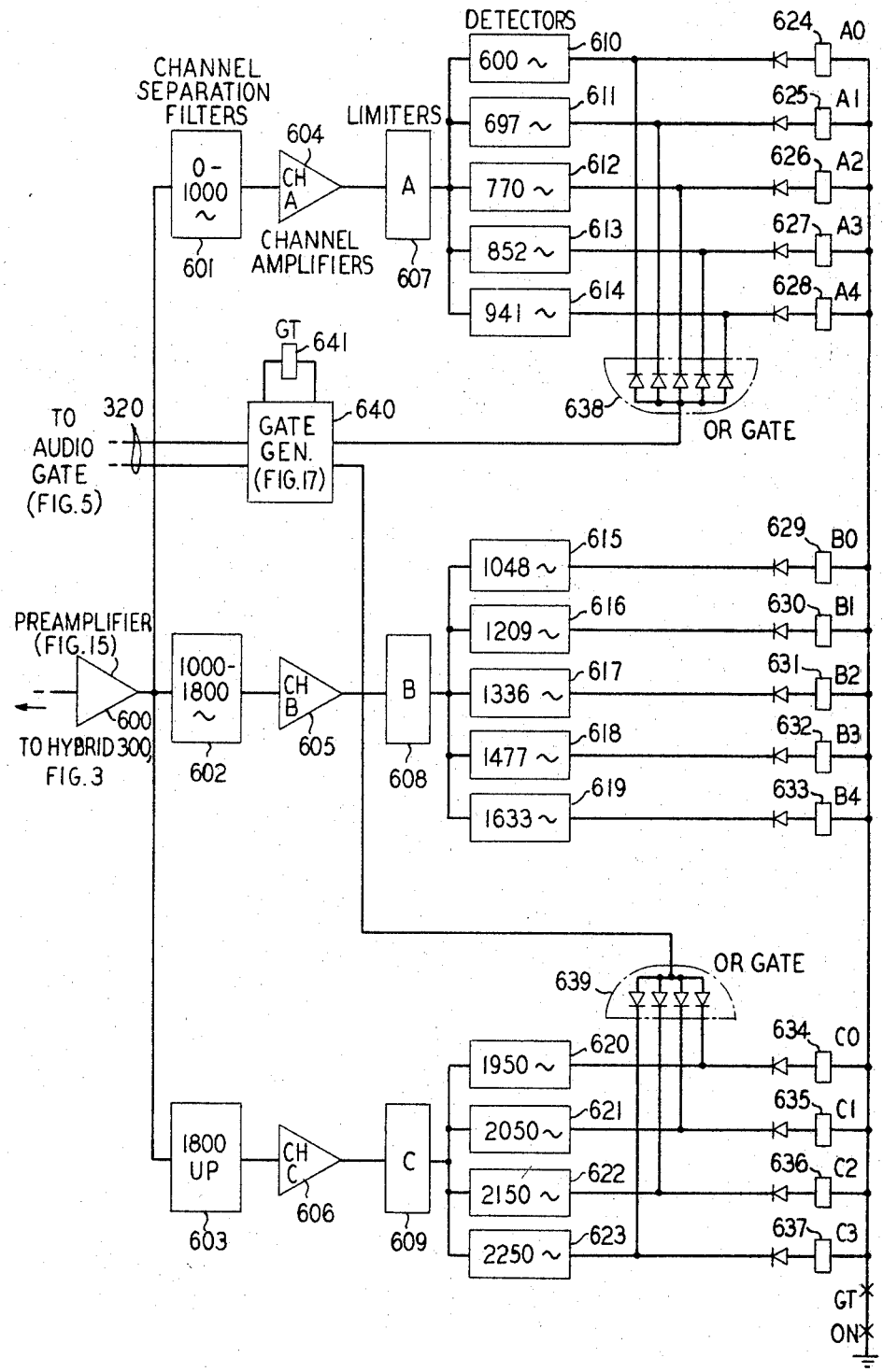

Nov. 12, 1968
C. R. DAVIES
3,410,966
SYSTEM FOR REMOTE TESTING OF TELEPHONE SUBSCRIBERS' LINES
Filed May 27, 1965
20 Sheets-Sheet 11
FIG. 13A    TEST RELAY REGISTER
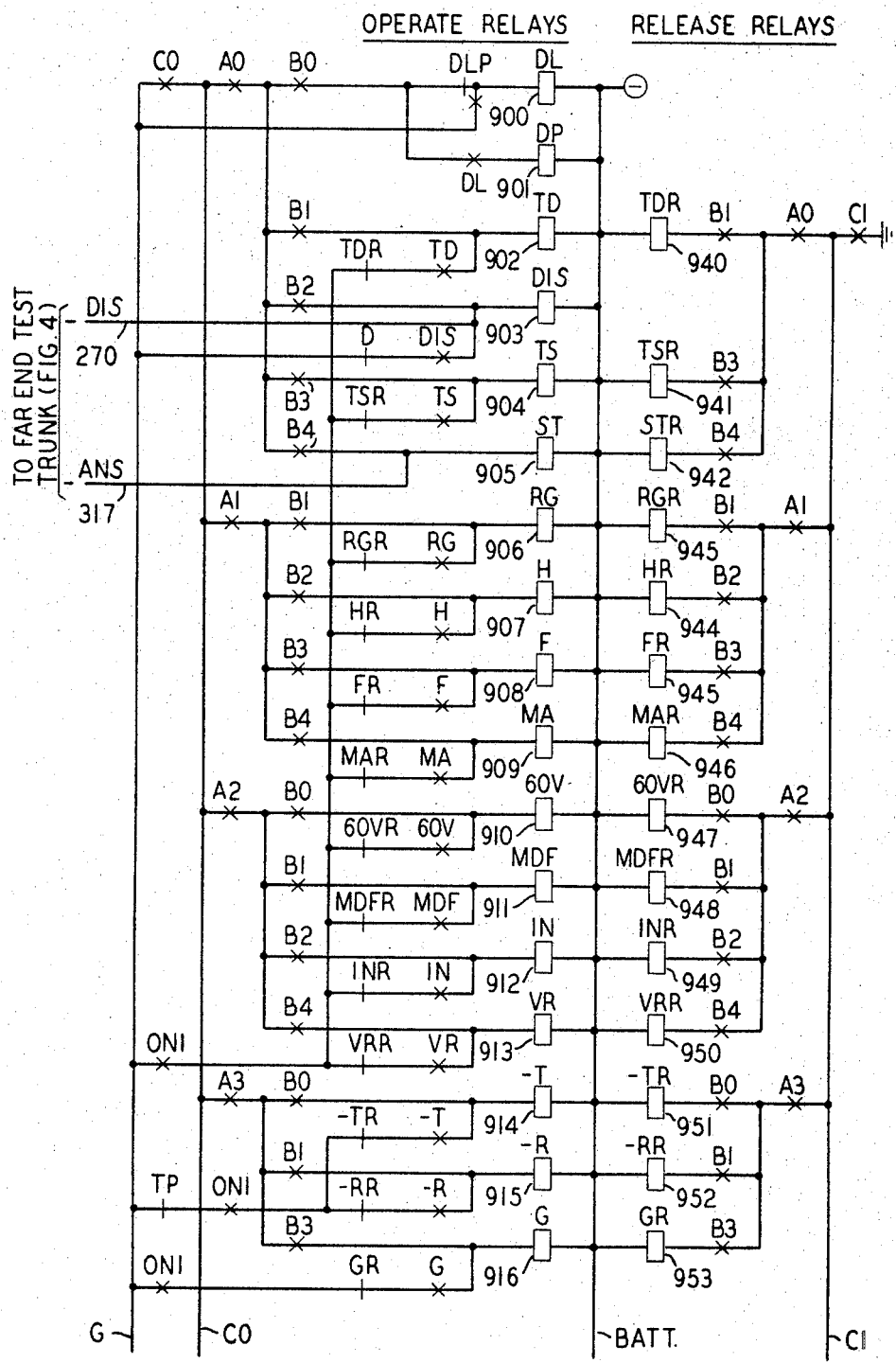

GATE GENERATOR

SUPERVISORY OSCILLATOR

DIAL TONE DETECTOR

END-OF-DIALING DETECTOR

United States Patent Office 3,410,966
Patented Nov. 12, 1968

3,410,966
SYSTEM FOR REMOTE TESTING OF TELEPHONE
SUBSCRIBERS' LINES
Chauncey R. Davies, Middletown, N.J., assignor to Bell
Telephone Laboratories, Incorporated, New York, N.Y.,
a corporation of New York
Filed May 27, 1965, Ser. No. 459,396
6 Claims. (Cl. 179—175.2)

ABSTRACT OF THE DISCLOSURE

A remotely controlled telephone loop testing system is disclosed in which local key operations are translated into multifrequency tone bursts which operate and release remote test relays. These test relays set up the loop test circuits and the direct current in the remote loop is translated into a variable frequency for transmission back to the local operator. At the local station, the variable frequency signal is retranslated to direct current and displayed on a meter for the local operator. Nondedicated trunks are used for all signaling and, since all signaling is voice frequency alternating current, may be of any length. Key operations are selected by an array of PNPN junction diodes connected in parallel such that only one of a plurality breaks down at any one time.

---

This invention relates to telephone testing systems and, more particularly, to the testing of local subscriber loops from remote testing centers.

The maintenance of a modern telephone system requires regular periodic testing of subscribers' lines to insure that customers receive continuous service of good quality. Since a large proportion of local subscriber loops are exposed to weathering, storm damage and vandalism, circuit continuity is often impaired by short circuits, grounding, line crosses and other troubles. These trouble conditions must be detected soon after their occurrence and located so that repairs can be made.

The basic testing of local subscriber loops is accomplished by applying test voltages to the loop conductors and observing the behavior of the current through the loop. Tests of the various functions of the local central office are also possible, as well as special tests for multiparty loops, pay station loops, ringing circuits, and so forth. The results of these tests can be read on a direct current meter connected to the loop.

Heretofore, a Local Test Desk (LTD) has been provided to perform all of the above tests as well as set up the necessary connections. Due to the necessity of providing direct current meter readings for most of these tests, the range over which these tests can be performed is severely limited. Direct current paths must be maintained to the local subscriber loops from the LTD. Moreover, the impedance of these direct current paths must be kept at a very small value to prevent undesired influences on the test readings. As a result, separate LTD's must be provided for each small geographical area, along with all of the attendant control and supervisory equipment. It is necessary, for example, to provide a number of test desks in a single large city where economics would normally dictate centralization of the test functions.

It is a general object of the present invention to extend the range of test facilities for testing local subscriber loops to theoretically unlimited geographical distances.

In order to extend the range of heretofore proposed subscriber loop test facilities, it is the practice to dedicate a number of inter-exchange test trunks for this purpose and to connect these trunks in parallel. This procedure does lower the resistance of the test facilities to acceptable ranges for smaller distances, but causes a corresponding increase in the capacity of the test facilities, thus making ballistic types of tests difficult or impossible. More importantly, the dedication of large numbers of inter-exchange trunks solely for subscriber loop testing greatly increases the cost of such testing facilities.

It is a further object of the invention to test local subscriber loops over non-dedicated trunking facilities in the commercial telephone network.

In accordance with the present invention, these general objects are achieved by the use of alternating current signaling between a test desk and a local exchange which may be as far from the test desk as desired. The local test conditions, such as test batteries, grounds and reversals, are provided for by remotely-controlled test facilities which may be identical in most respects to those previously used. The control of these test facilities, however, is achieved by the use of a system of alternating current signals transmitted from the test desk location to the remote location where they are detected and used to control the local test facilities. In a similar fashion, the direct current test readings at the local exchange are transformed into alternating current signals and transmitted back to the test desk to be detected and used to operate a meter.

From the above description, it can be seen that the local test desk facilities for the system of the present invention can be maintained exactly as they have been for previously-used systems. These facilities include a dial, a head set, a direct current meter and a number of control keys to set up the desired tests. The present invention comprises a signaling system which utilizes the direct current outputs of these facilities to generate the required alternating current signals. Similarly, the direct current in the local subscriber loop is used to generate an alternating current signal on which the direct current signal is modulated. In the preferred embodiment, pulses of multifrequency tones are used for control signaling while frequency modulation is used for transmitting the direct current readings.

In a signaling system such as is required in the present invention, each multifrequency signal requires a minimum duration in order to be received accurately at the remote exchange. It is desirable, however, that the testman not be restricted to operating the control keys at any prescribed rate.

It is a more specific object of the present invention to successively generate a plurality of signals, each for a predetermined length of time, and selected randomly from a plurality of requests for such signals.

In accordance with this aspect of the present invention, a lock-out selector is provided which selects one control signal at random from a plurality of possible control signals, transmits that control signal for a predetermined duration, meanwhile locking out all other control signals, and then proceeds to select the remaining control signals at random, one at a time, for similar transmission. Specifically, an array of PNPN junction diodes are connected through a common impedance to a common voltage supply. The other terminals of these diodes are selectively grounded by requests for signals, i.e., by the operation of the supervisory control keys.

Such diodes have a dynamic negative resistance region between a stable low conduction state and a stable high conduction state. If a plurality of these diodes are simultaneously grounded, the first to achieve a high conduction state reduces the voltage across the others, preventing them from making the transition. Due to the negative resistance characteristic, only one diode at a time can traverse the negative resistance region. The selection of which diode makes the transition first is determined by minute random circuit variations.

These and other objects and features, the nature of the present invention and its various advantages, will be more readily understood upon consideration of the attached drawings and of the following detailed description of the drawings.

In the drawings:

FIG. 12 is a detailed schematic diagram of the multifrequency receiver shown in FIG. 5;

Figure 4:
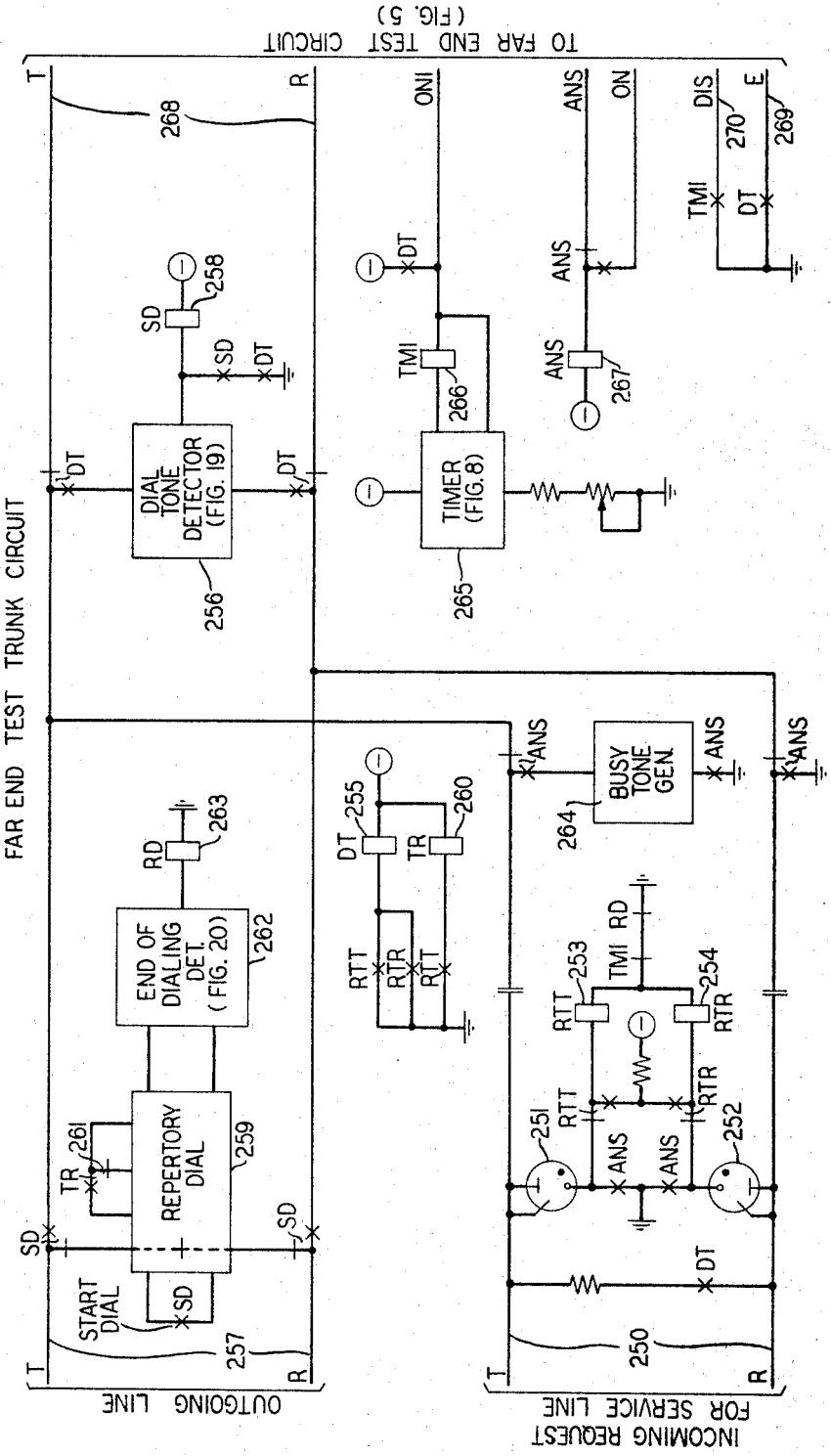
FIG. 4 is a more detailed block diagram of the far end test trunk circuit shown in FIG. 1.
Figure 5:
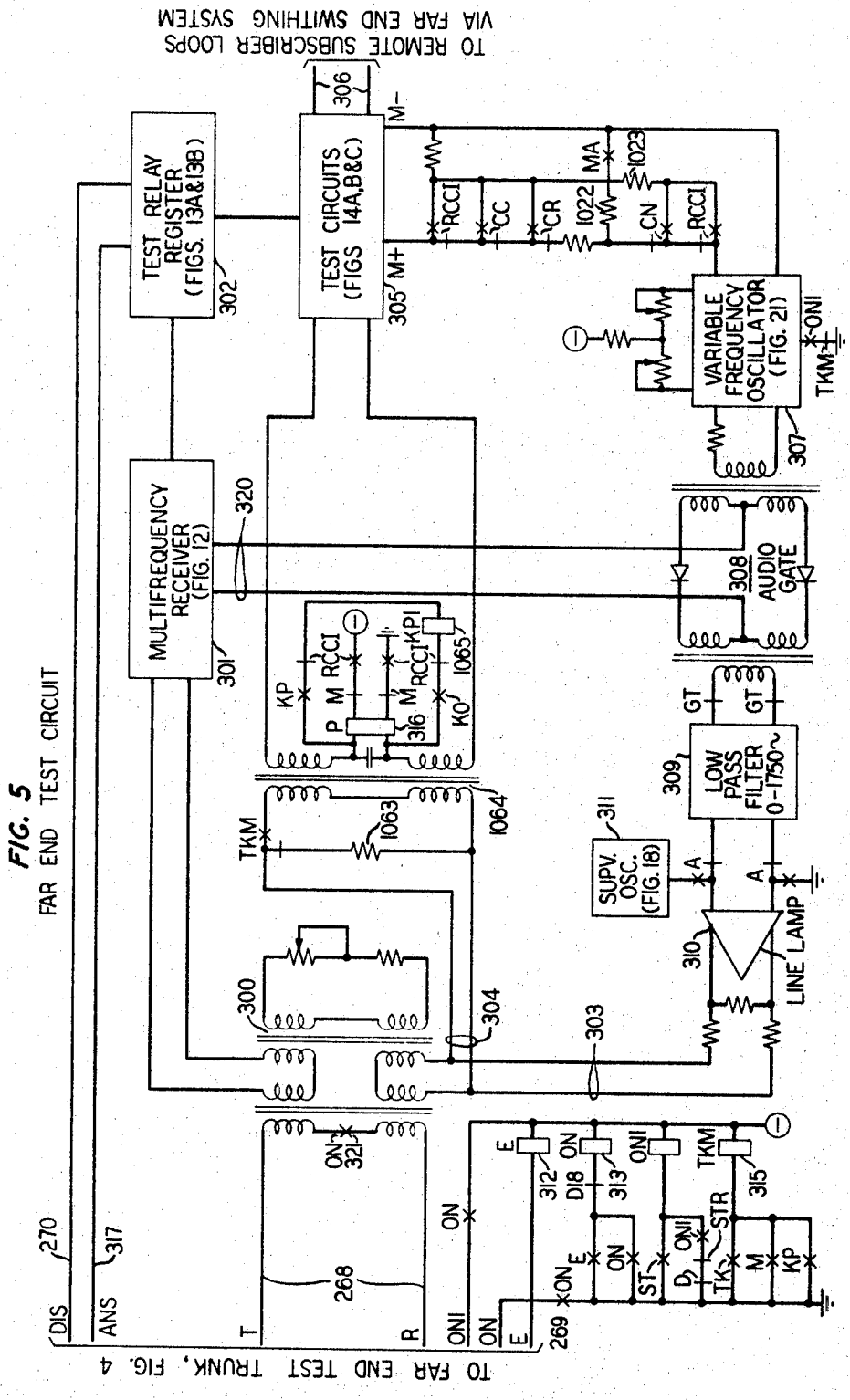
FIG. 5 is a more detailed block diagram of the far end test circuit shown in FIG. 1.
Figure 13B:
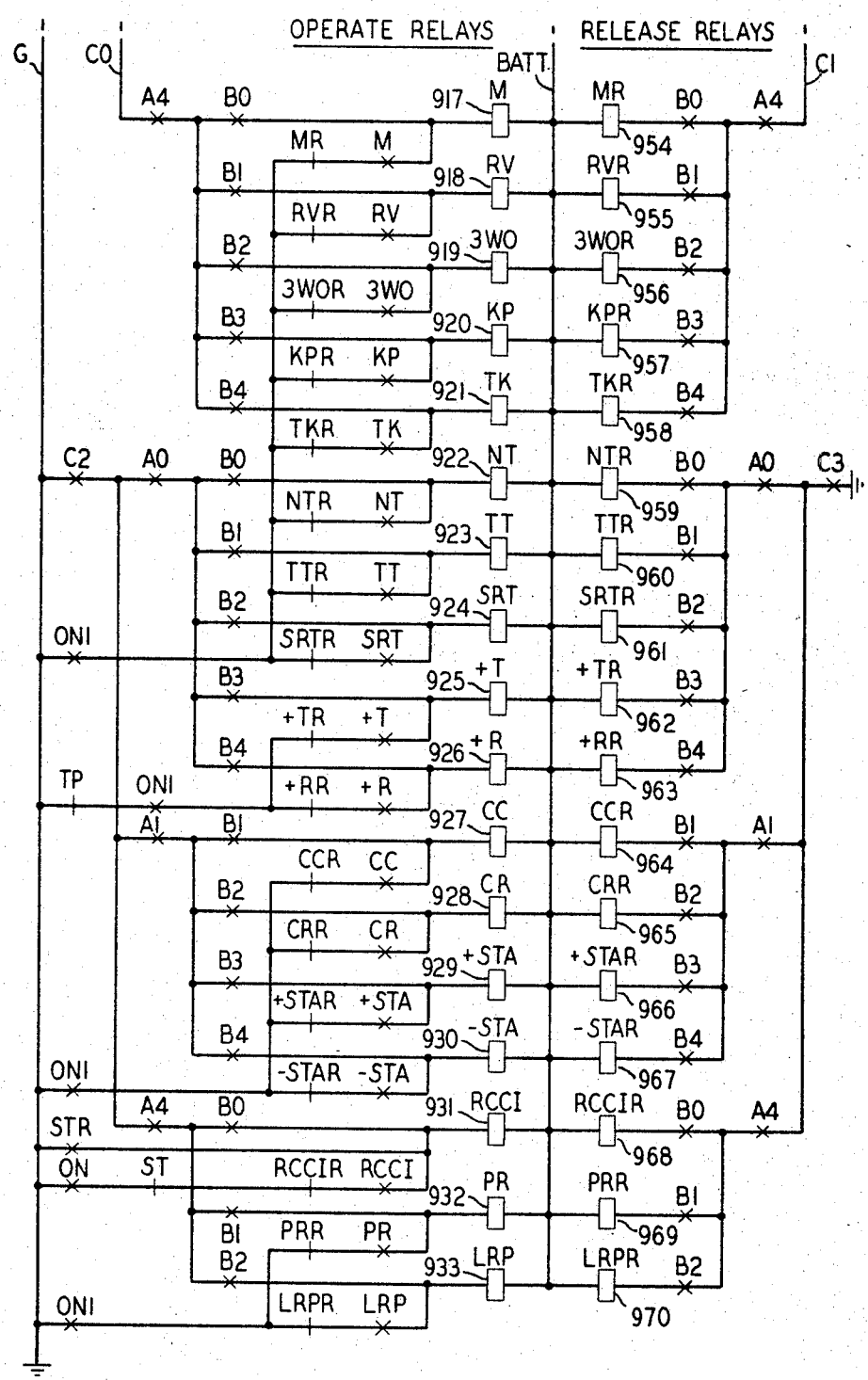
Figure 14A:
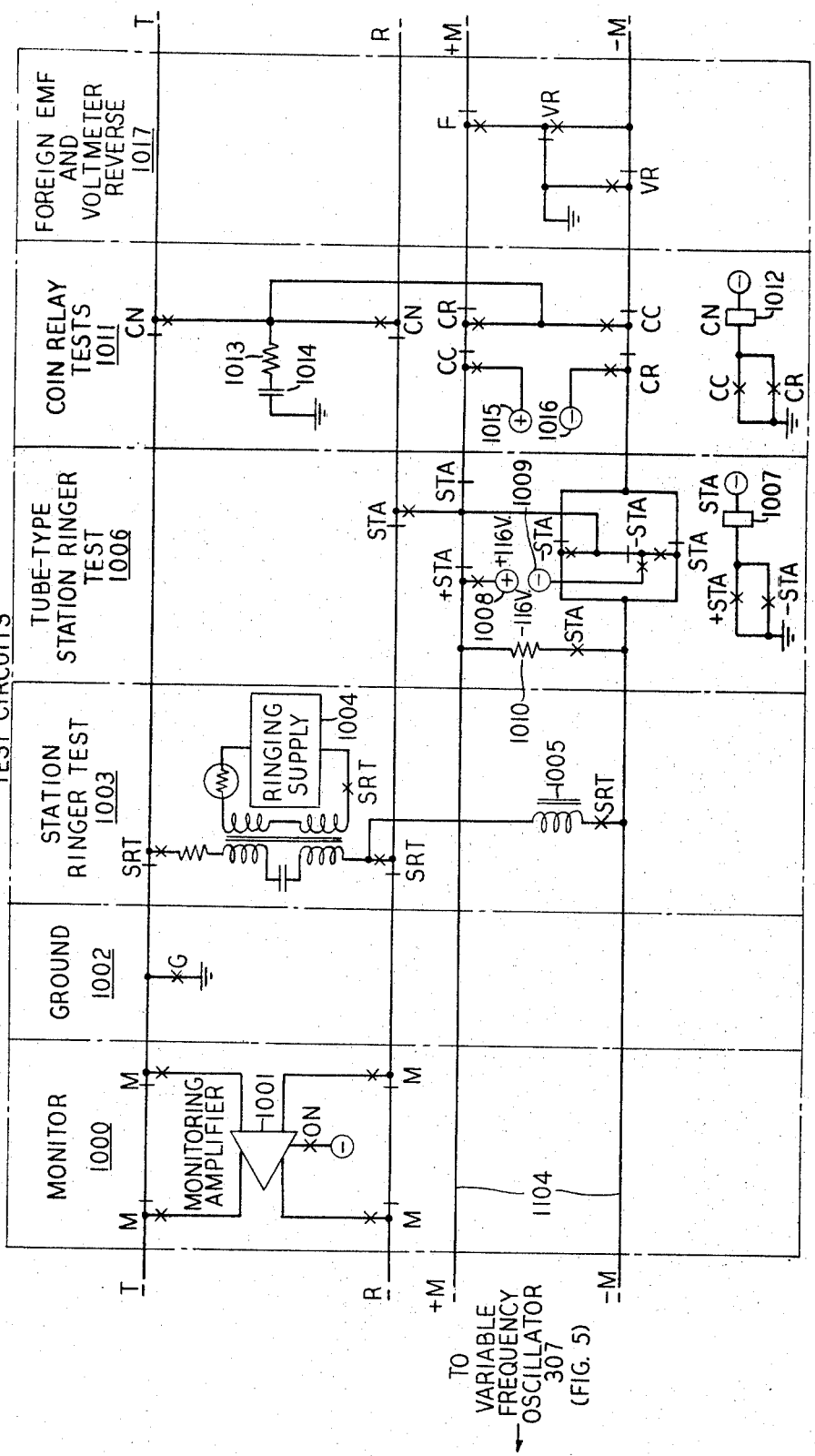
Figure 14B:
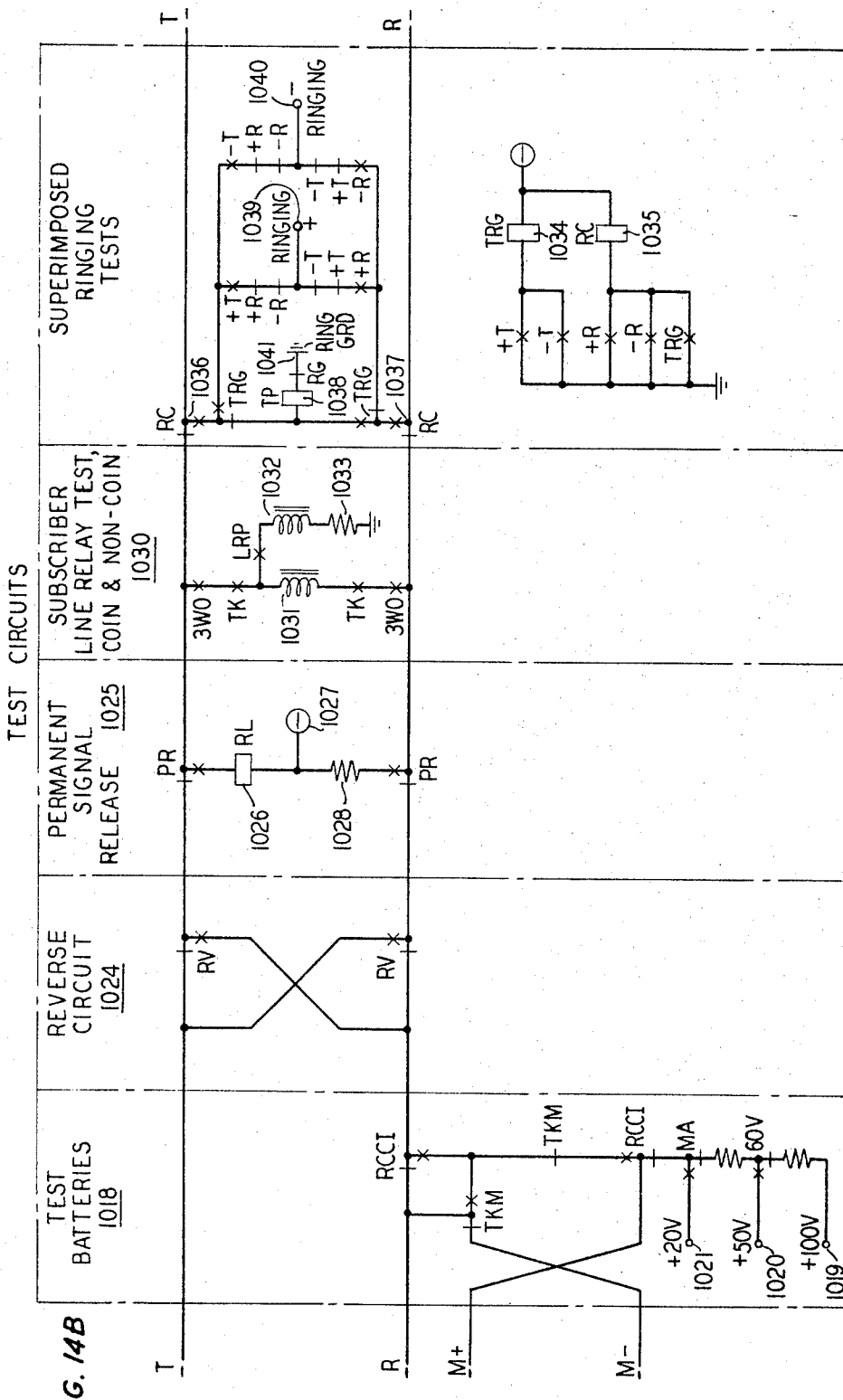
Figure 14C:
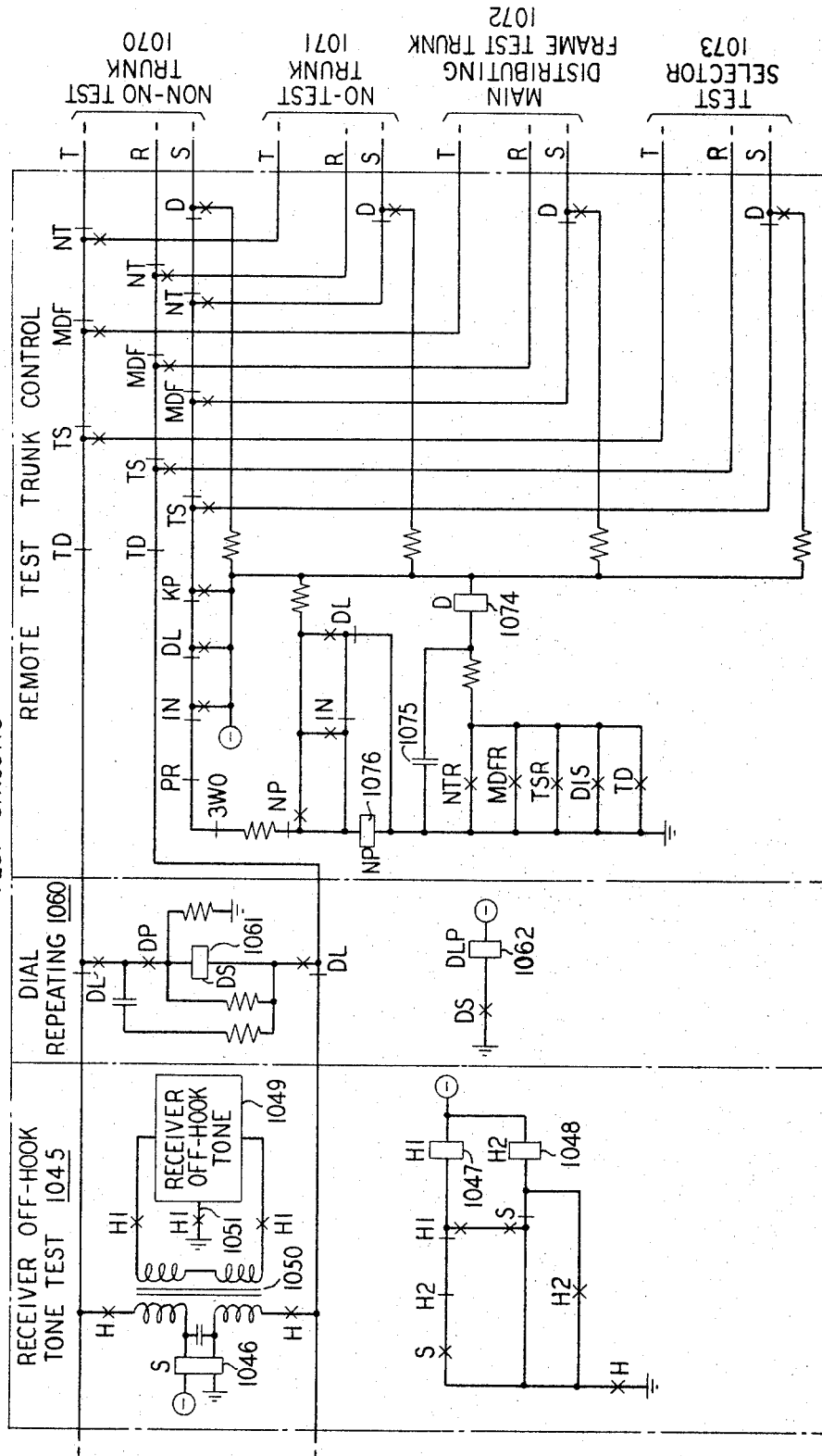
Figure 15:
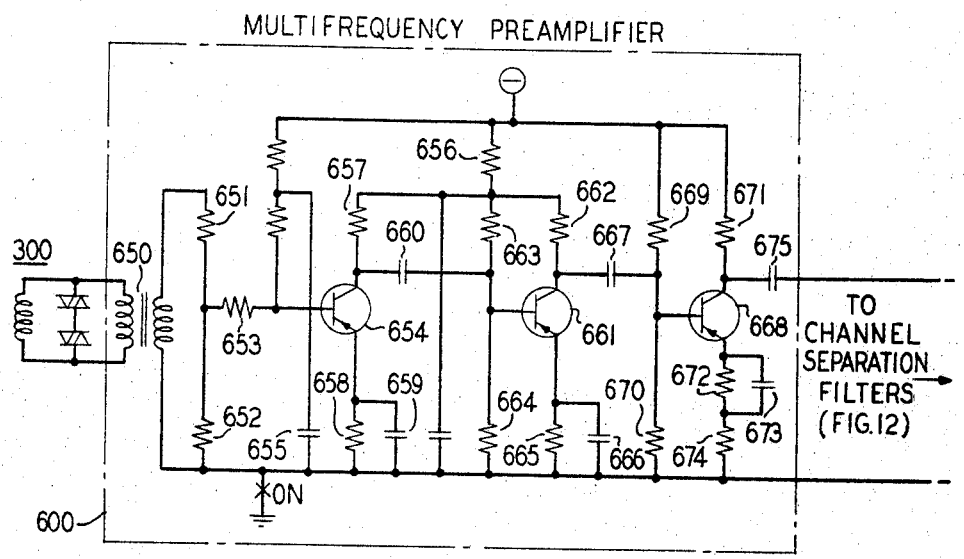
Figure 16:
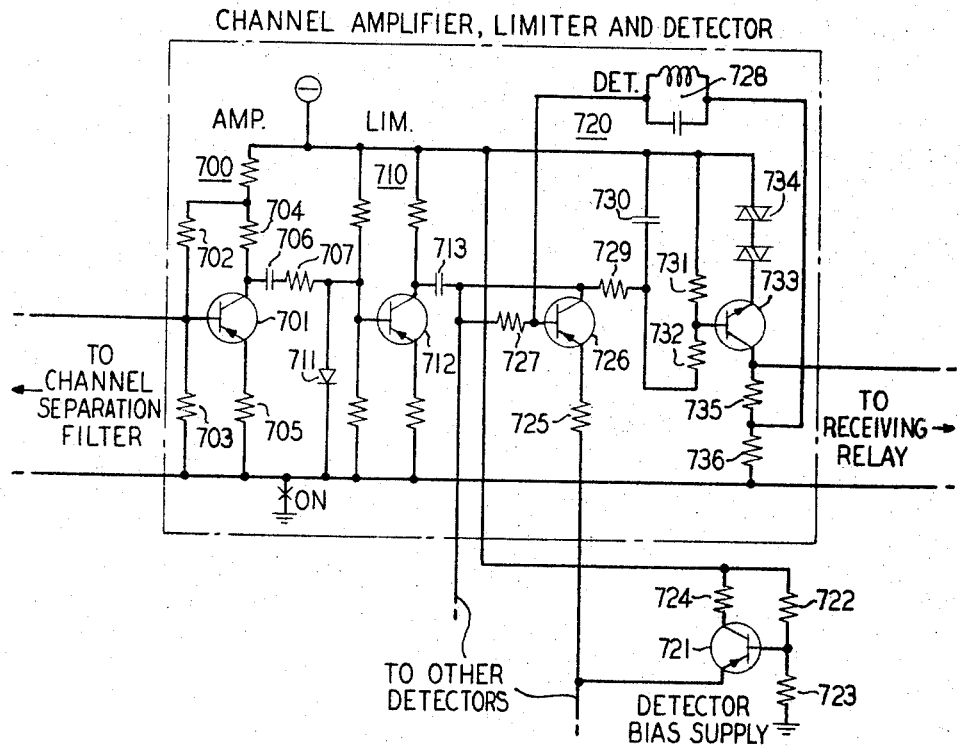
Figure 17:
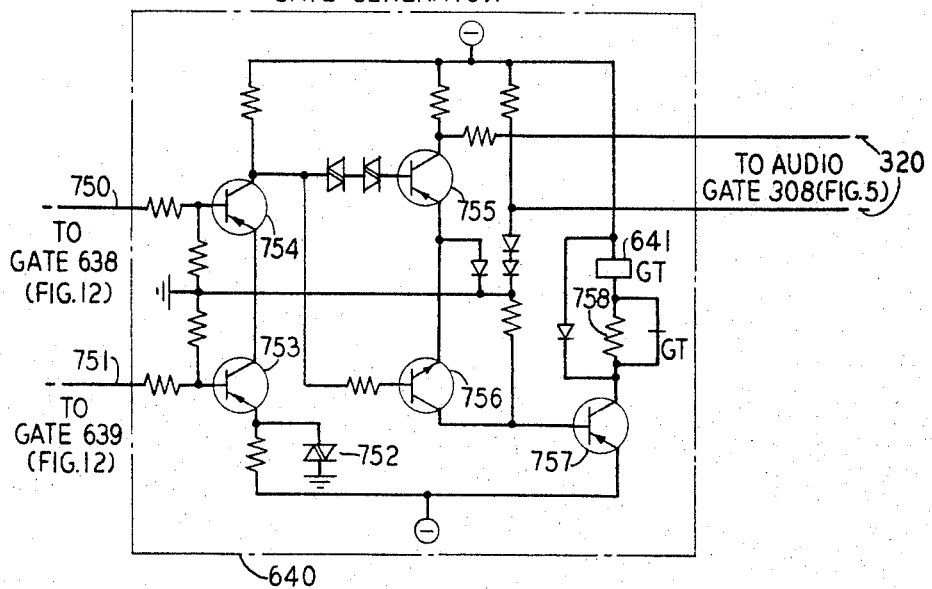
Figure 18:
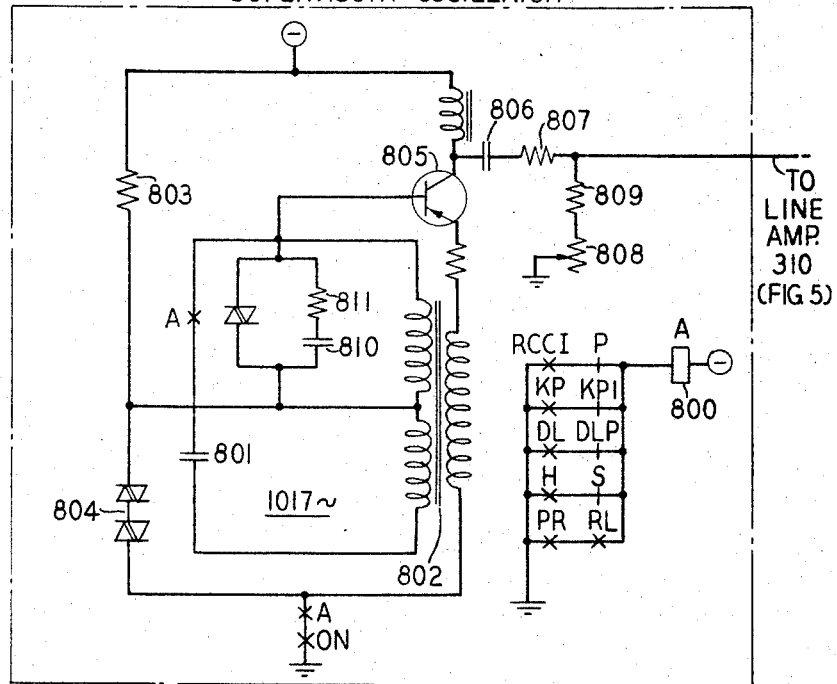
Figure 19:
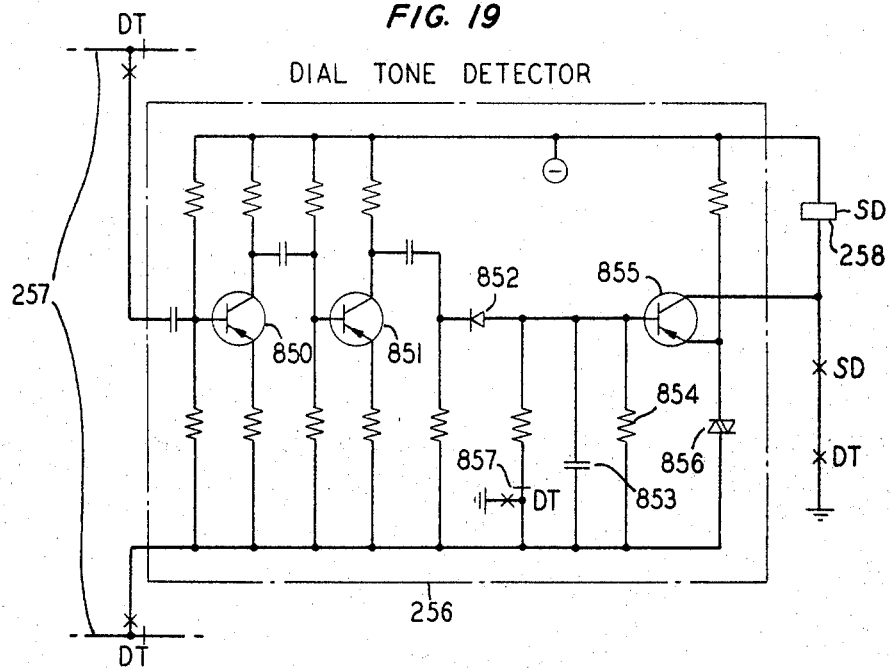
Figure 20:
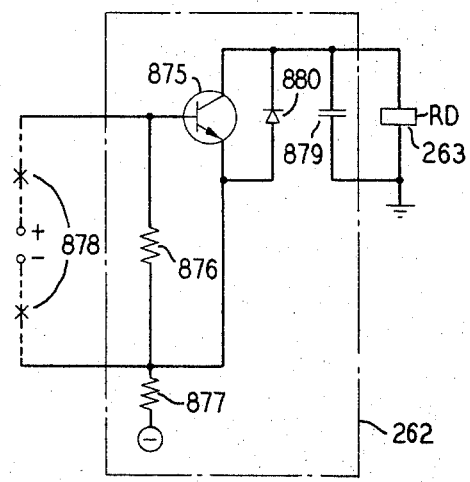
Figure 21:
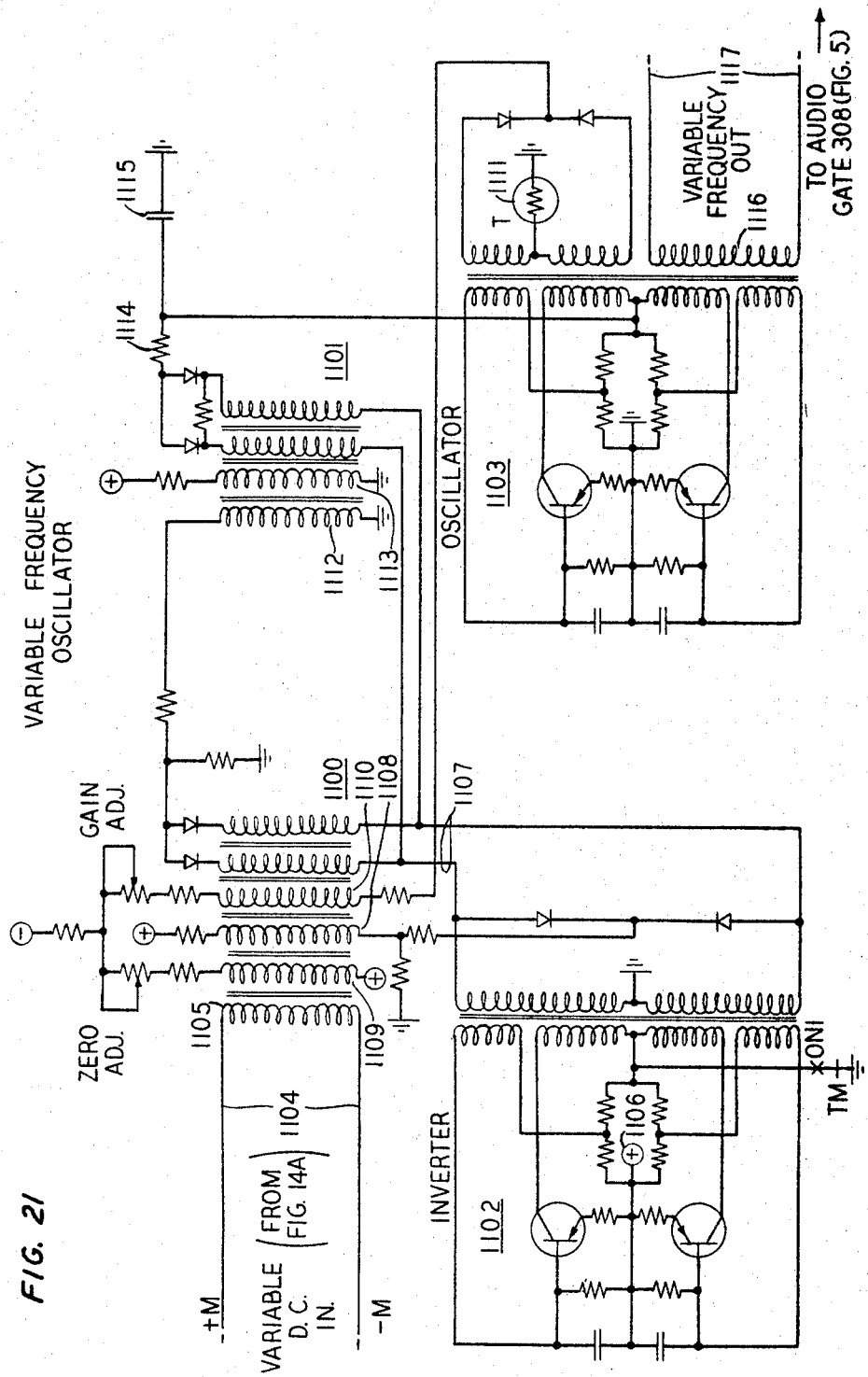
Figure 22:
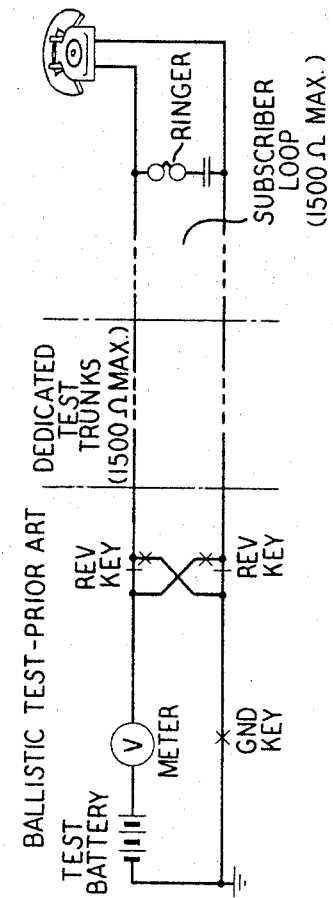
Figure 23:
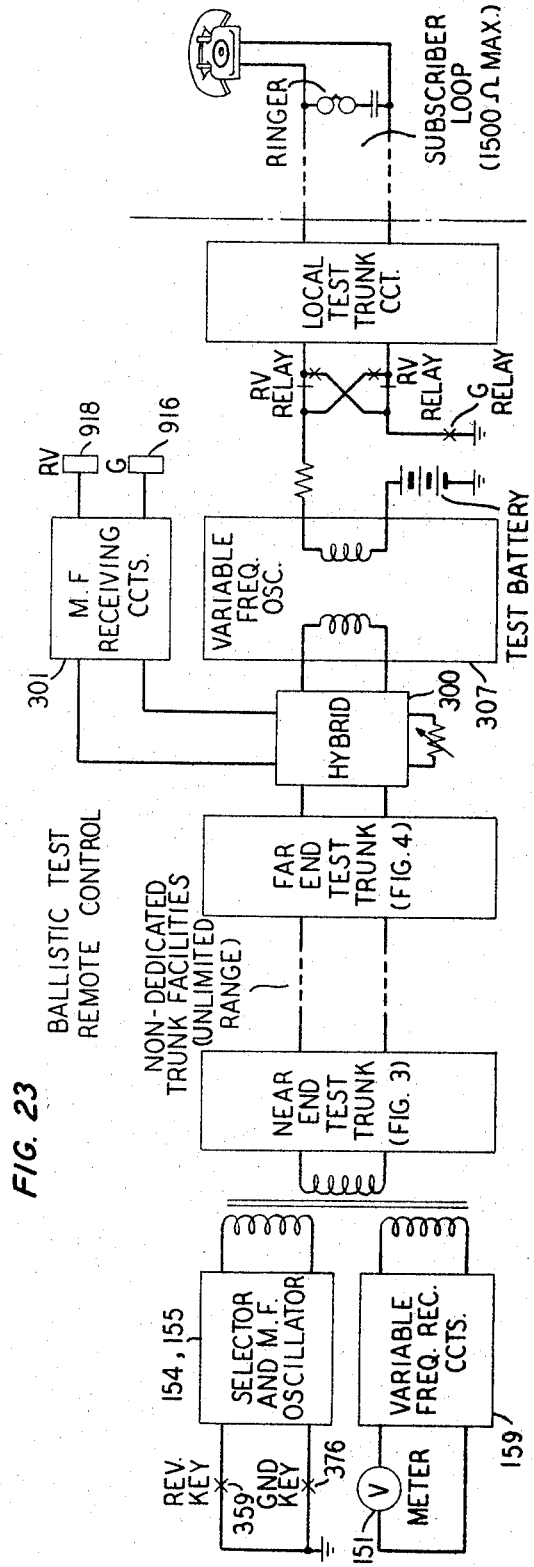

FIGS. 13A and 13B comprise a detailed circuit diagram of the test relay register shown in FIG. 5;

FIGS. 14A, 14B and 14C comprise a detailed circuit diagram of the test circuits shown in FIG. 5;

FIG. 15 is a detailed circuit diagram of the multifrequency preamplifier shown in FIG. 12;

FIG. 16 is a detailed circuit diagram of the channel amplifier, limiter and multifrequency signal detector shown in FIG. 12;

FIG. 17 is a detailed circuit diagram of the gate generator shown in FIG. 12;

FIG. 18 is a detailed circuit diagram of the 1017 cycle supervisory oscillator shown in FIG. 5;

FIG. 19 is a detailed circuit diagram of the dial tone detector shown in FIG. 4;

FIG. 20 is a detailed circuit diagram of the end-of-dialing detector shown in FIG. 4;

FIG. 21 is a detailed circuit diagram of the variable frequency oscillator shown in FIG. 5;

FIG. 22 is a simplified circuit diagram of an illustrative test arrangement for local subscriber loops in accordance with the prior art; and FIG. 23 is a simplified circuit diagram of the same illustrative test arrangement for local subscriber loops in accordance with the present invention.

Before proceeding with a detailed description of the drawings, it will be convenient to first take up a convention which has been followed for all of these drawings. This convention, commonly known as the "detached contact" convention, is based on the supposition that relay drawings will be easier to follow if the schematic diagrams do not attempt to associate all the contacts of a relay with the structure which makes or breaks, i.e., closes or opens, these contacts. This supposition is particularly valid when each relay winding controls a large number of contacts which are specifically related to totally different functions. The convention used herein follows the drawing analysis described by F. T. Meyer in "An Improved-Detached Contact Type of Schematic Circuit Drawings," published in Communications and Electronics, No. 20, pages 505–513, September 1955.

In accordance with this convention, a rectangle represents a relay winding and structure, excepting the contacts actuated by that structure. A set of normally open or make contacts is shown by two short crossed lines through the center of which passes a solid line representing the connecting leads to the set of make contacts. A set of normally closed or break contacts is shown by a short line perpendicular to and across a solid line representing connecting leads to the set of break contacts. A set of transfer contacts, i.e., a movable contact moving from one fixed contact to another fixed contact upon the operation of the relay, is shown by two perpendicular lines, one terminating in the other. A make contact is drawn on one of the lines meeting at the intersection; a break contact is drawn on another of the lines meeting at the intersection; and no contact whatever is drawn on the third line. According to the convention, the lead with no contact representation thereon is transferred from the lead including the break contact to the lead including the make contact upon actuation of the relay.

The capital letters and numerals or combinations thereof appearing adjacent each rectangle identifies the particular relay. Corresponding letters and numerals adjacent to a set of contacts identify these contacts as being operated by a relay bearing the same letters and numerals. Other circuit elements are shown in the usual form.

For ease in reading the drawings, whenever possible, the relays have been shown as operated from a negative voltage source supplying a bus to the right of the relay winding. The ground for this negative voltage course is, whenever possible, represented as a bus to the left of the relay winding. The combinations of make, break, and transfer contacts which complete the energization of a relay winding are shown on conductors extending through the relay winding from the voltage supply bus to the ground bus.

Figure 1:
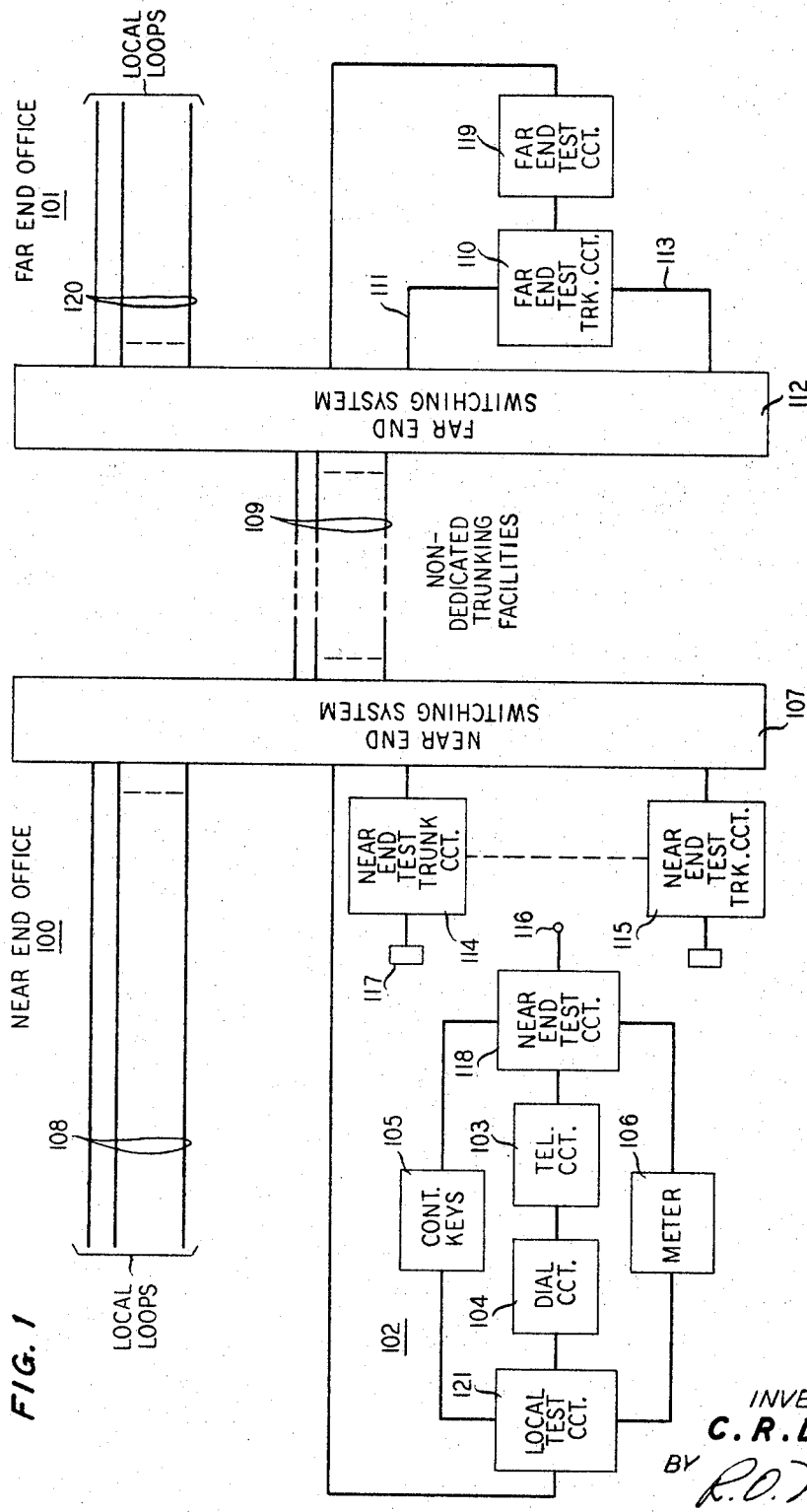
FIG. 1 is a schematic block diagram of the remote subscriber loop testing system of the present invention.

Referring then to FIG. 1, there is shown a general block diagram of a subscriber loop testing system in accordance with the present invention. Since the testing system of the present invention involves the testing of local subscriber loops from remotely located office locations, for the purpose of illustration, two office locations, 100 and 101, have been illustrated in FIG. 1. The near end office 100 includes all of the equipment necessary to initiate subscriber loop tests for subscriber loops at that office and at any one of a number of remote offices.

The far end office 101 includes all of the equipment necessary for local subscriber loops at that office to be tested from a remotely located central office. It is to be understood, however, that near end central office 100 is capable of servicing any number of remote central offices, and, moreover, may at the same time include facilities for testing its own local subscriber loops from yet another remotely located office. Hence, the equipments illustrated in FIG. 1 represent only the minimum equipment necessary for testing local subscriber loops from remotely located central offices, and is not to be taken in a limiting sense.

Referring then to local office 100, there is shown Local Test Desk (LTD) facilities 102 including a standard telephone circuit 103 and an associated dialing circuit 104, along with test control keys 105 and a direct current meter circuit 106. When LTD 102 is engaged in testing a local subscriber loop in near end office 100, the control keys 105 are used to set up the test conditions in local test circuits 121. The results of these tests can then be read on meter 106. The dial circuit 104 is utilized to set up connections to the local subscriber loops through the near end switching system 107.

Switching system 107 may comprise any type of telephone switching system in use for the purpose of setting up telephone connections between subscribers either locally or by way of trunk facilities to remote locations. Such a switching system may, for example, be manual, panel, step-by-step, crossbar, or completely electronic. In any event, the switching system responds to calling signals from the dial circuit 104 to set up the two-way connections between the various appearances at the interface of the switching system and the balance of the telephone network. Thus, a plurality of local subscriber loop circuits 108 is shown connected to switching system 107 along with a plurality of interoffice trunks 109.

When a testman wishes to conduct local subscriber loop tests at a remote office such as far end office 101, the testman utilizes the dial circuit 104 to establish a telephone connection between LTD 102 and the far end office 101 by way of a non-dedicated trunk included in the group 109.

At far end office 101, ringing current is then applied to far end test trunk circuit 110 by way of an appearance 111 at the far end switching system 112. Like switching system 107, far end switching system 112 may comprise any type of switching facility available in the telephone plant.

In response to the presence of a ringing signal on appearance 111, far end test trunk circuit 110 automatically initiates the operation of a program-controlled calling device which produces on appearance 113 the telephone number assigned to the initiating test center. These calling signals cause switching system 112 to establish a second connection between far end test trunk circuit 110 through yet another trunk within the group 109 to the near end switching system 107.

A plurality of near end test trunk circuits 114–115 are connected to appearances on switching system 107. Each of near end test trunks 114–115 is assigned to one remotely located central office. The near end test trunk circuit assigned to office 101, for example, near end test trunk circuit 114, is assigned the telephone number which far end test trunk circuit 110 automatically calls over appearance 113. When this connection is established to near end test trunk 114, a supervisory lamp flashes and the testman then inserts a plug 116 into jack 117 to complete the circuit from near end test trunk 114 to near end test circuit 118. At this time, the original connection set up between LTD 102 and far end test trunk circuit 110 is taken down and appearance 111 is made busy.

The testman at LTD 102 may now proceed to set up the local loop tests by means of the dial circuit 104 and control keys 105 in the same manner that such tests are set up for local subscriber loops. Near end test circuit 118, however, translates these key operations into multifrequency signals which are transmitted by way of near end test trunk circuit 114, trunking facilities 109, and far end test trunk circuit 110 to the far end test circuit 119. At far end test circuit 119, the multifrequency signals are received, detected, decoded, and utilized to operate relays to set up the appropriate test conditions at far end office 101.

Direct current levels appearing at far end test circuit 119 are translated to frequency-modulated waves and transmitted, via the non-dedicated facilities and near end test trunk circuit 114, to near end test circuit 118. Here these FM signals are demodulated and the resulting direct current signal applied directly to meter circuit 106.

The testman may use the dial circuit 104 to set up test connections to as many local subscriber loops in far end office 101 as are desired without releasing the connection between near end test circuit 118 and far end test circuit 119. When these tests are completed, the operation of an appropriate key serves to release all the test connections and return these circuits to normal. Thereafter, other similar connections to other remote offices may be set up and tests conducted in the same way.

It can be seen from the description of FIG. 1 that the present invention provides a means for testing local subscriber loops in remote office locations with no more difficulty than similar tests performed on subscriber loops in the local office. Moreover, since all of the signals transmitted between the central office locations are translated to alternating current signals within the voice frequency band, all of the available trunking facilities, including wire pairs, carrier systems, coaxial, microwave, submarine cable or even satellite channels can be used with equal facility. In addition, there is no limit on the geographic separation of these two central offices since all that is required in the way of transmission facilities between the locations is the normal speech path provided for ordinary telephone conversations.

Figure 2:
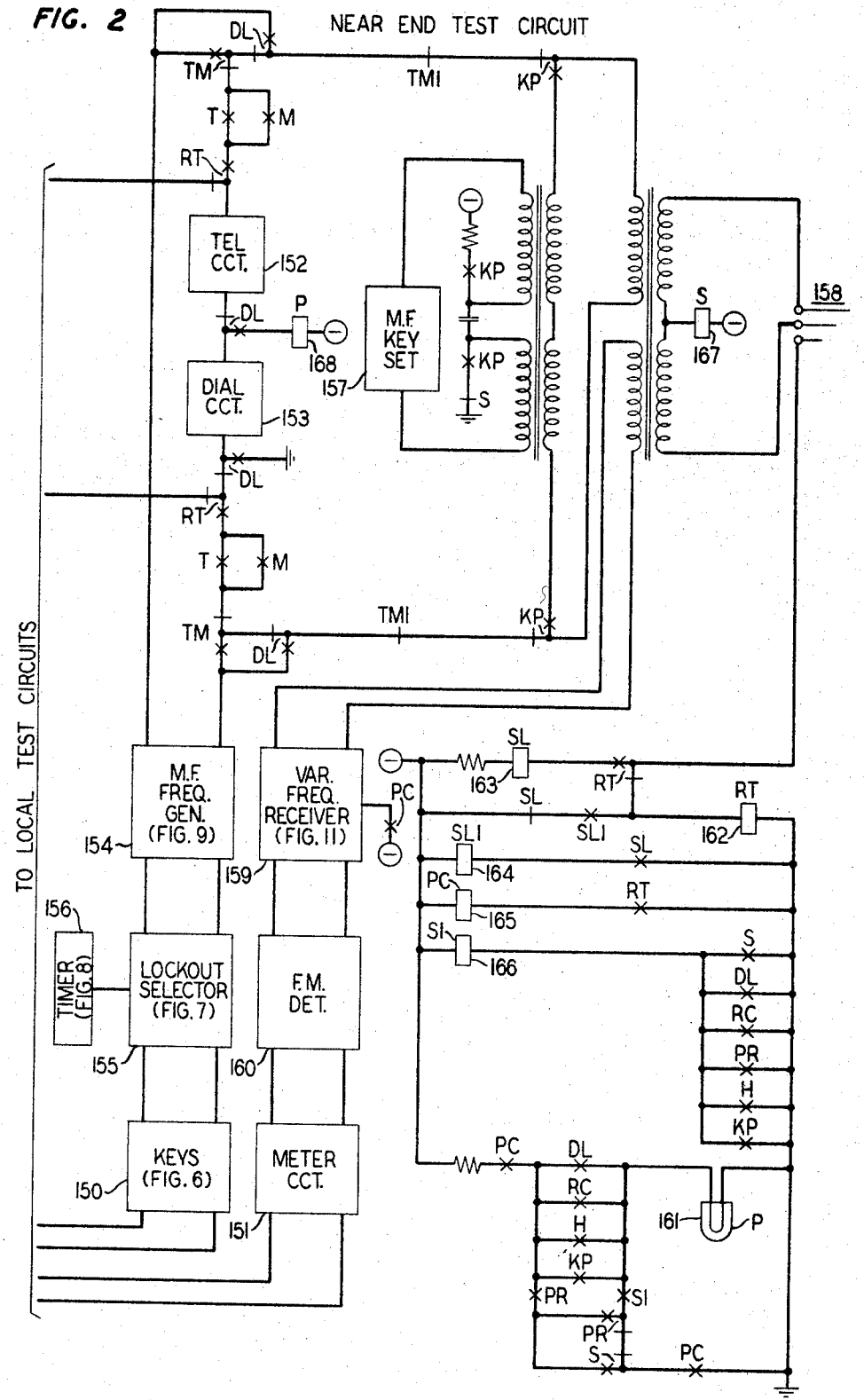
FIG. 2 is a more detailed block diagram of the near end test circuits shown in FIG. 1.

In FIG. 2 there is shown a more detailed block diagram of the near end test circuit 118 shown in block form in FIG. 1. The near end test circuit of FIG. 2 comprises the key control circuit 150, corresponding to the control keys 105 in FIG. 1; the meter circuit 151, corresponding to meter 106 in FIG. 1; and the telephone circuit 152 and dial circuit 153, corresponding to 103 and 104, respectively, in FIG. 1. In addition, a multifrequency code generator 154 is provided to translate the key operations in key control circuit 150 into multifrequency codes.

As is well understood, for such a multifrequency code to be accurately detected at a remote location, it is necessary that this code be transmitted for at least a minimum duration. It is desirable, however, that the testman operating the keys in key control circuit 150 not be required to wait for the termination of this transmission period between successive operations of the keys. To make this possible, a lock-out selector 155 is provided which selects, on a random basis, one of the key operations in key control circuit 150, signals this particular function by way of multifrequency code generator 154 for the prescribed timed interval, as indicated by timing circuit 156, and meanwhile locks out all of the other keyed signals.

At the termination of the timed interval, indicated by timer 156, lock-out selector 155 terminates the transmission of that particular multifrequency code, opens the lock-out circuit and again selects at random one of the remaining key operations. These successive random selections continue until all of the key operations called for have been handled. Lock-out selector 155 then waits for a new request for service.

Since connections to some central office locations are better controlled by multifrequency code pulses rather than direct current dial pulses, a multifrequency key set 157 is also provided to allow the testman to set up connections by means of multifrequency key pulse codes.

The near end test circuit of FIG. 2 is provided with the conventional telephone plug 158 (corresponding to plug 116 in FIG. 1) which is used to connect the test circuit of FIG. 2 to a near end test trunk as illustrated in FIG. 1.

The near end test circuit of FIG. 2 also includes facilities for receiving meter readings which are frequency-modulated in the voice frequency band. These signals are received by variable frequency receiver 159 where they are amplified and applied to a frequency-to-voltage transducer 160. The output of transducer 160 corresponds precisely to the original direct current to be metered and is applied to meter circuit 151.

A supervisory lamp 161 is also provided to give lamp signals to the testman. The control circuits for the supervisory lamp 161, as well as the control of relays 162 through 168, will be described hereinafter in connection with the description of the operation of the overall system.

Figure 6:
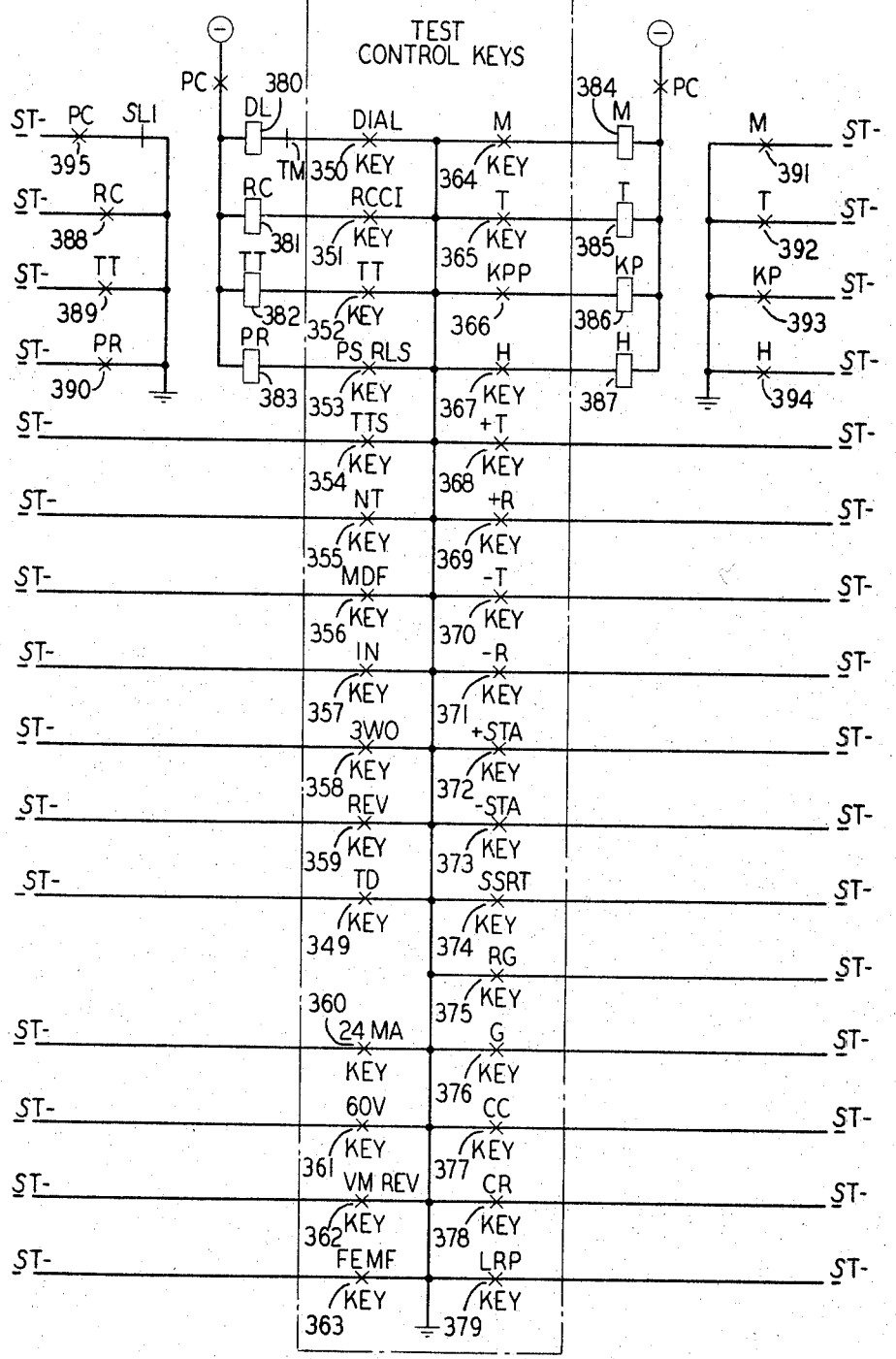
FIG. 6 is a detailed circuit diagram of the key control circuits shown in FIG. 2.

In FIG. 6 there is shown a detailed circuit diagram of the key control circuits shown as element 150 in FIG. 2. The key control circuit of FIG. 6 comprises a plurality of locking keys 349 through 379, each one, when operated, initiating the transmission of a multifrequency code signal to the far end test circuits. Keys 350 through 353 and 364 through 367 are connected directly to the operating windings of respective ones of relays 380 through 387. Relays 381 through 387, in turn, operate respective ones of contacts 388 through 394. Finally, PC relay 165 in FIG. 2 operates contacts 395.

Each of the above noted key operations or relay operations causes a ground to appear on one out of a corresponding number of ST– leads. Thus the circuit of FIG. 6 comprises a direct current, manually controlled signal source in which the direct current signals comprise a direct current ground on any one of a plurality of output leads. These output leads are connected to a lock-out selector shown in more detail in FIG. 7.

Figure 7:
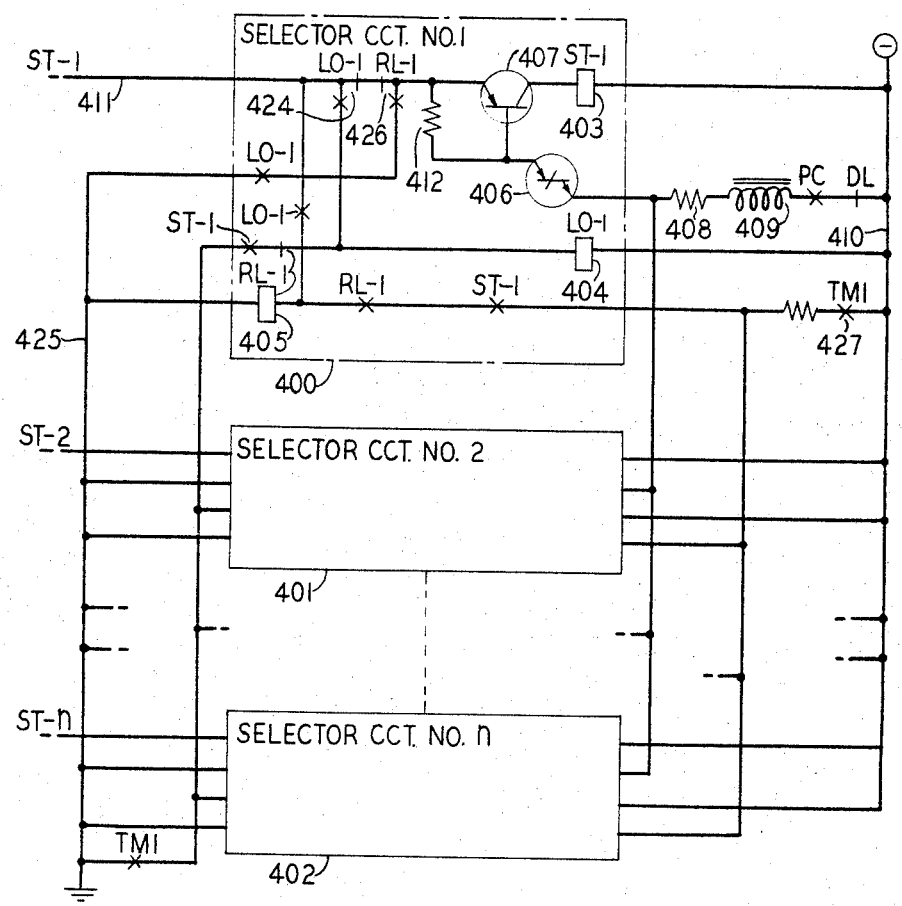
FIG. 7 is a detailed circuit diagram of the lock-out selector shown in FIG. 2.

Turning then to FIG. 7, there is shown a lock-out selector circuit corresponding to element 155 in FIG. 2 and comprising a plurality of individual selectors 400, 401, and 402, equal in number to the number of output leads from the key control circuits of FIG. 6. Since each of selector circuits 400 to 402 is identical to the others, only the details of selector circuit 400 have been illustrated in FIG. 7.

Selector circuit 400 comprises ST–1 relay 403, an LO–1 relay 404, and an RL–1 relay 405. In addition, selector circuit 400 includes a PNPN diode 406 having the base of a transistor 407 connected to one terminal thereof. Each of the remaining selector circuits includes a PNPN diode similar to diode 406, one terminal of each of these diodes being connected to the current limiting resistor 408 through an inductor 409 to a negative voltage supply bus 410. The diodes corresponding to diode 406 each have a dynamic negative resistance region between a stable low conduction state and a stable high conduction state. One terminal of each of these diodes is connected to a corresponding output lead from the key control circuits of FIG. 6. The other terminal of all of these diodes is connected through a common load impedance including resistor 408 and inductor 409 to the common voltage supply bus 410.

When any one or more of the input leads, corresponding to input lead 411 to selector circuit 400, is grounded, only one of these PNPN diodes traverses the negative resistance region between its low conduction and high conduction states. Due to the voltage drop across resistor 408, the transition of any one of these diodes prevents any subsequent transitions in the others. Moreover, due to the negative resistance characteristic, only one diode is able to traverse the negative region at one time. This is because, in the negative resistance region, a differential increase in current through a diode is accompanied by a corresponding decrease in potential across the diode. If one or more diodes attempt to pass through the region together, a momentary unbalance between them results in only one diode attaining a stable high conduction state while the others return to the low conduction state. To further insure this result, the inductor 409 is provided to slow up the current build-up through the diodes and hence increase the time which it takes to traverse the negative resistance region.

When one diode traverses this region, for example, diode 406, a voltage is developed across resistor 412 which causes transistor 407 to go into saturation. Under this condition, ST–1 relay 403 operates. Contacts on ST–1 relay 403 set up the necessary connections for the multifrequency tone generator, insuring the transmission of the corresponding multifrequency code. In addition, ST–1 relay 403 operates make contacts in the operate path of TM relay 413 in the timer circuit of FIG. 8. Finally, make contacts on ST–1 relay 413 prepare a path for the enablement of LO–1 relay 404.

Figure 8:
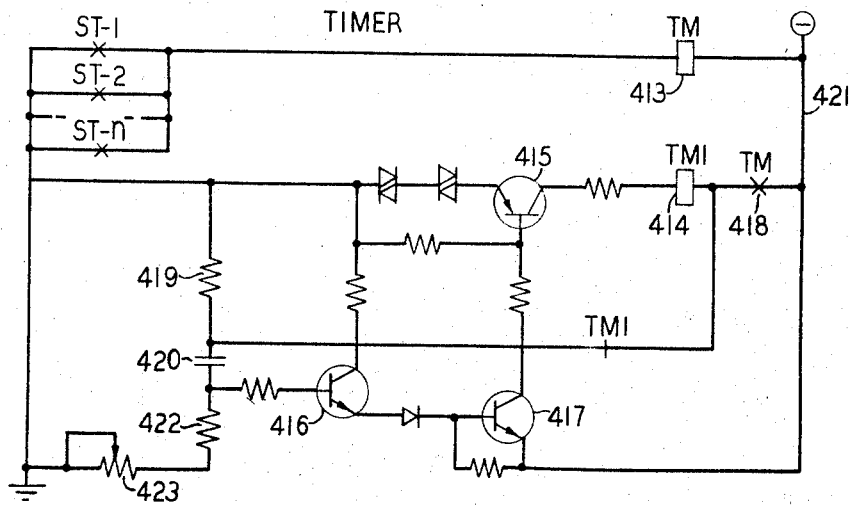
FIG. 8 is a detailed circuit diagram of the timer circuit shown in FIGS. 2 and 4.

Turning momentarily to the timer circuit of FIG. 8, there is shown a detailed circuit diagram of the timer 156 in FIG. 2. The timer circuit of FIG. 8 comprises TM relay 413, TM1 relay 414 and transistors 415, 416, and 417. In the normal condition, transistors 415, 416, and 417 are each forward biased into their "on" states. TM1 relay 414 does not operate at this time, however, due to the open TM contacts 418 in its operate path.

When TM relay 413 is operated by make contacts on one of the ST– relays in the lock-out selector of FIG. 7, the midpoint between resistor 419 and capacitor 420 goes from ground potential to the voltage on negative voltage bus 421. This voltage shift reverse biases transistor 416, turning transistor 416 off. This, in turn, turns transistors 415 and 417 off. Although TM contacts 418 are now operated, TM1 relay 414 does not operate because transistor 415 is off.

Capacitor 420 begins to discharge toward ground potential through resistors 422 and 423. When the midpoint between capacitor 420 and resistor 422 had decayed sufficiently, transistor 416 again conducts, turning on transistor 417 and then transistor 415. When transistor 415 goes on, TM1 relay 414 operates, indicating the completion of a timing interval.

It can be seen that the timer circuit of FIG. 8 operates to time an interval initiated by the operation of TM relay 413 and terminated by the operation of TM1 relay 414. The duration of this interval can be adjusted by adjusting variable resistor 423. This period is, in fact, adjusted to the duration required for error-free reception of these codes at the far end tone receiver.

Returning to FIG. 7, the operation of TM1 relay 414 completes the operate path for LO–1 relay 404 which then operates. LO–1 relay 404, in turn, opens the operate path for ST–1 relay 403, at contacts 424, transferring the ground on lead 411 to its own winding. ST–1 relay 403 therefore releases, releasing TM relay 413 in FIG. 8.

Returning to FIG. 8, when TM relay 413 is released, TM contact 418 opens to release TM1 relay 414. Capacitor 420 quickly recharges through the conducting path provided by transistor 416. The circuit is then completely cycled and returned to normal and may again be used for another timing cycle.

In FIG. 7, LO–1 relay 404 remains locked to the ground on lead 411 until the key in the key control circuits of FIG. 6 is released. At this time, the shunt around RL–1 relay 405, provided by the key operation, is removed and RL–1 relay 405 operates in series with LO–1 relay 404 to voltage supply bus 410.

RL–1 relay 405, in operating, operates transfer contacts 426 to provide another ground for diode 406. As discussed above, diode 406 thereafter eventually traverses to its high conduction state, turning transistor 407 on and again operating ST–1 relay 403. From this point on, the operation of the timing circuit is the same as that described above except that, with RL–1 relay 405 operated, the multifrequency tone transmitted by the code generator is modified to provide a release signal for this particular key operation. RL–1 relay 405 is released at the end of the timing cycle by means of the make contact 427 of TM1 relay 414.

It can be seen that the lock-out selector of FIG. 7 operates to select a particular key operation for signaling by turning on one of the PNPN diodes and operating the corresponding ST– relay. Once the diode has traversed to its high conduction region and signaling is completed, the ground is removed by means of contacts 424 or 426, returning the diode to its low conduction state. Another similar diode in one of the selector circuits 401 through 402 may now traverse the negative resistance region in an identical manner. Thus, the circuit of FIG. 7 serves to select, on a random basis, the various key operations and to enable the code generator to transmit a code corresponding to the key operation, terminating the code after a preselected time interval. Only one of these codes is transmitted at a time due to the fact that only one diode, corresponding to diode 406, can be in its high conduction state at a time.

It can also be seen that separate signals are transmitted for the operation and release of each key. It is therefore unnecessary to transmit a continuous signal throughout the testing interval for which a particular key remains operated. The far end test circuits, of course, utilize holding circuits to hold the initial key operation signal registered until receipt of the corresponding key release signal.

Figure 9:
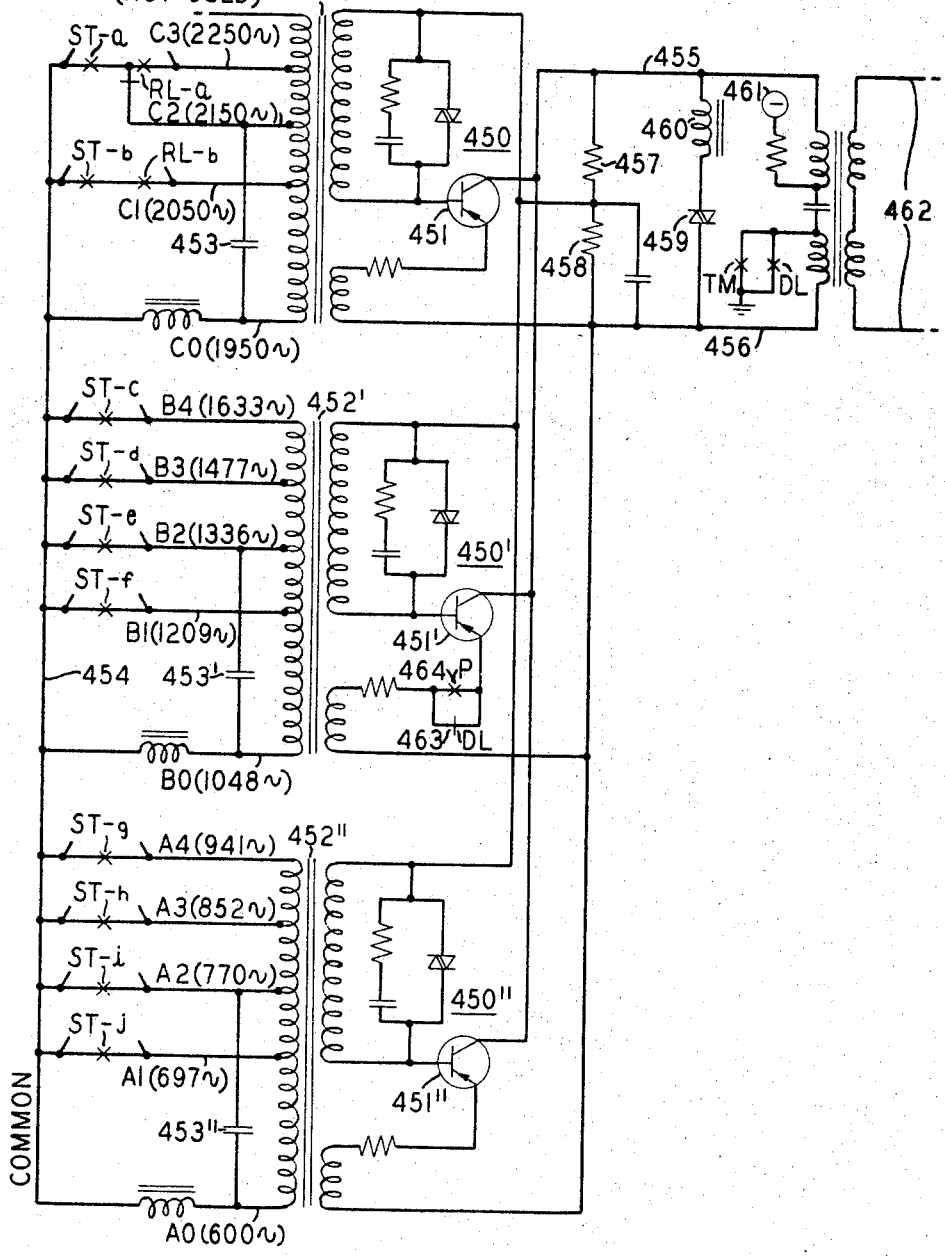
FIG. 9 is a detailed circuit diagram of the multifrequency code generator shown in FIGS. 2 and 3.

In FIG. 9 there is shown a detail circuit diagram of the multifrequency code generator shown as element 154 in FIG. 2. The code generator of FIG. 9 comprises three oscillators 450, 450' and 450". Each of these oscillators includes a transistor, i.e., transistors 451, 451' and 451", respectively. The base circuit of each of these transistors is coupled to one winding of a respective one of transformers 452, 452' and 452". The emitter of each of these transistors is likewise coupled to another winding of transformers 452, 452' and 452", respectively. Each of transformers 452, 452' and 452" includes a tuned secondary comprising a tapped secondary winding and respective ones of capacitors 453, 453' and 453". Each of these oscillators is tuned by tuning the corresponding secondary winding of its transformer. Thus, oscillator 450 is tuned by the selective connection of the taps on the tuned secondary winding of transformer 452, to the common bus 454. These selective connections are made by means of contacts on the ST– and RL– relays corresponding to relays 403 and 405 in FIG. 7. The frequencies involved and the relay contacts operated are shown on Table I:

TABLE I

| Code | Freq. (c.p.s.) | Contacts (FIG. 9) |
| --- | --- | --- |
| A0 | 600 | None |
| A1 | 697 | ST–j |
| A2 | 770 | ST–i |
| A3 | 852 | ST–h |
| A4 | 941 | ST–g |
| B0 | 1,048 | None |
| B1 | 1,209 | ST–f |
| B2 | 1,336 | ST–e |
| B3 | 1,477 | ST–d |
| B4 | 1,633 | ST–c |
| C0 | 1,950 | None |
| C1 | 2,050 | ST–b, RL–b |
| C2 | 2,150 | ST–a |
| C3 | 2,250 | ST–a, RL–a |

The outputs from transistors 451, 451' and 451", appearing on the collectors thereof, are connected to line 455 while the emitter circuits of these transistors are terminated at conductor 456. A voltage divider including resistors 457 and 458 is utilized to provide the bias on the base of these transistors. Diode 459 insures the proper collector voltage for the transistors while inductor 460 limits the shunting effect of diode 459 across the outputs of the transistor oscillators.

Figure 3:
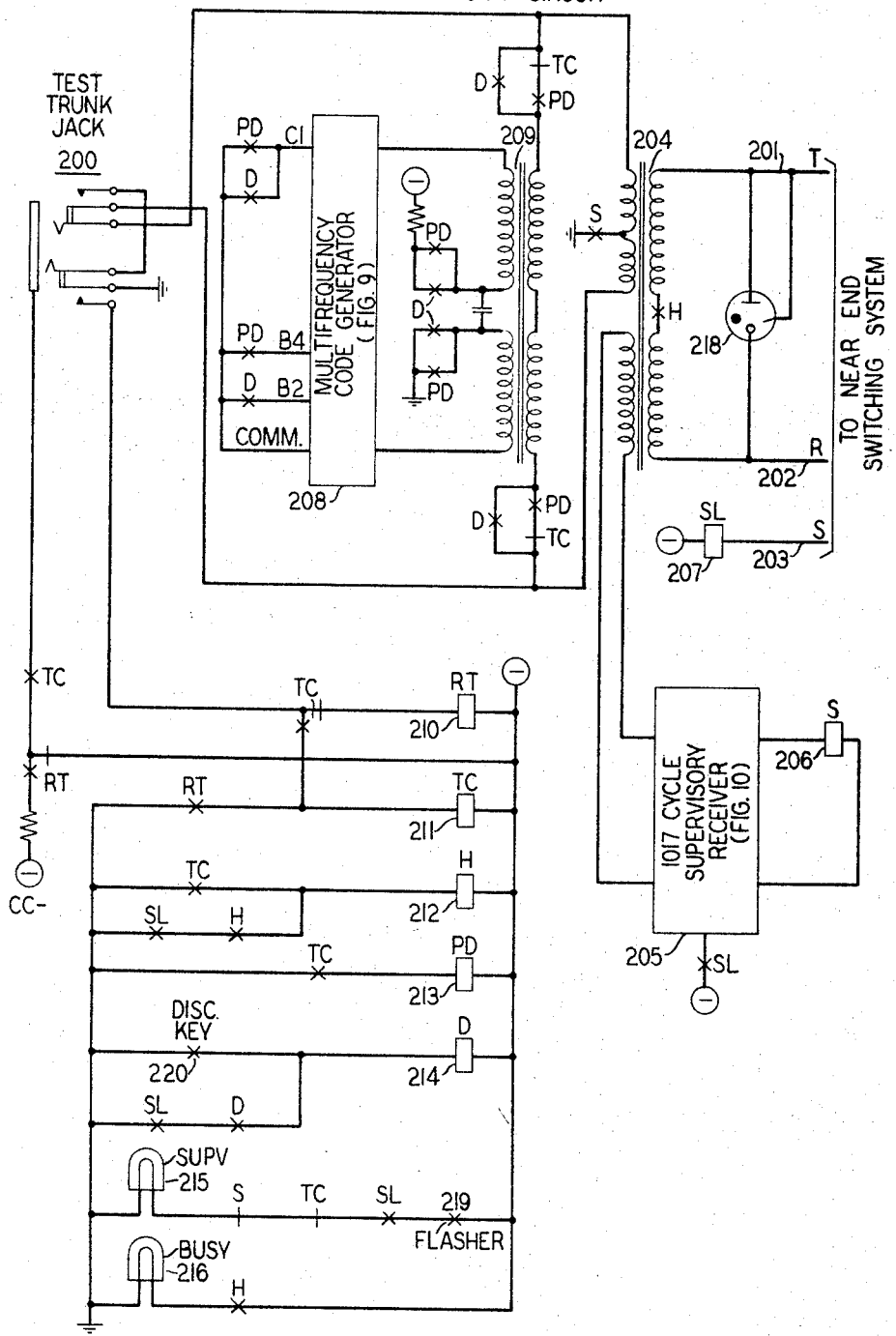
FIG. 3 is a more detailed block diagram of the near end test trunk circuit shown in FIG. 1.

The oscillators are energized by voltage source 461 upon the completion of the direct current path by make contacts on TM relay 413 (FIG. 8) or DL relay 380 (FIG. 6). As will be noted hereinafter, the operation of either one of these relays requires the transmission of a multifrequency-coded signal. These multifrequency-coded signals appear on output line 462. As can be seen in FIGS. 2 and 3, these multifrequency signals are applied through plug 158 and the near end test trunk circuit of FIG. 3 to the transmission facilities connecting the near end office to the far end testing circuits.

Table II is a listing of the various frequencies of the multifrequency code generator of FIG. 9 assigned to the various signals initiated by the operation of the control keys of FIG. 6, together with the far end relays operated thereby.

TABLE II.—MULTIFREQUENCY SIGNALING CODES

| Key or Relay | Code When Operated | Far End Relay (FIG. 13) | Code When Released | Far End Relay (FIG. 13) |
| --- | --- | --- | --- | --- |
| DIAL | A0-B0-C0 | DL, DP | | |
| TD | A0-B1-C0 | TD | A0-B1-C1 | TDR |
| DISC (FIG. 3) | A0-B2-C0 | DIS | | |
| TTS | A0-B3-C0 | TS | A0-B3-C1 | TSR |
| PC (Relay) | A0-B4-C0 | ST, ANS | | |
| RG | A1-B1-C0 | RG | A1-B1-C1 | RGR |
| H | A1-B2-C0 | H | A1-B2-C1 | HR |
| FEMF | A1-B3-C0 | F | A1-B3-C1 | FR |
| 24MA | A1-B4-C0 | MA | A1-B4-C1 | MAR |
| 60V | A2-B0-C0 | 60V | A2-B0-C1 | 60VR |
| MDF | A2-B1-C0 | MDF | A2-B1-C1 | MDFR |
| IN | A2-B2-C0 | IN | A2-B2-C1 | INR |
| VM REV | A2-B4-C0 | VR | A2-B4-C1 | VRR |
| –T | A3-B0-C0 | –T | A3-B0-C1 | –TR |
| –R | A3-B1-C0 | –R | A3-B1-C1 | –RR |
| G | A3-B3-C0 | G | A3-B3-C1 | GR |
| M | A4-B0-C0 | M | A4-B0-C1 | MR |
| REV | A4-B1-C0 | RV | A4-B1-C1 | RVR |
| 3WO | A4-B2-C0 | 3WO | A4-B2-C1 | 3WOR |
| KPP | A4-B3-C0 | KP | A4-B3-C1 | KPR |
| T | A4-B4-C0 | TK | A4-B4-C1 | TKR |
| NT | A0-B0-C2 | NT | A0-B0-C3 | NTR |
| TT | A0-B1-C2 | TT | A0-B1-C3 | TTR |
| SSRT | A0-B2-C2 | SRT | A0-B2-C3 | SRTR |
| +T | A0-B3-C2 | +T | A0-B3-C3 | +TR |
| +R | A0-B4-C2 | +R | A0-B4-C3 | +RR |
| CC | A1-B1-C2 | CC | A1-B1-C3 | CCR |
| CR | A1-B2-C2 | CR | A1-B2-C3 | CRR |
| +STA | A1-B3-C2 | +STA | A1-B3-C3 | +STAR |
| –STA | A1-B4-C2 | –STA | A1-B4-C3 | –STAR |
| RCCI | A4-B0-C2 | RCCI | A4-B0-C3 | RCCIR |
| PS RLS | A4-B1-C2 | PR | A4-B1-C3 | PRR |
| LRP | A4-B2-C2 | LRP | A4-B2-C3 | LRPR |

For the signaling of dial pulses, DL relay 380 in FIG. 6 operates to open break contacts 463 in FIG. 9, thus allowing make contacts 464 of P relay 168 (FIG. 2) to turn oscillator 450' off and on. Meanwhile, oscillators 450 and 450" operate at their normal or quiescent frequencies. Dial pulsing therefore comprises two fixed frequencies accompanied by a third frequency interrupted at the dial pulse rate.

Figure 11:
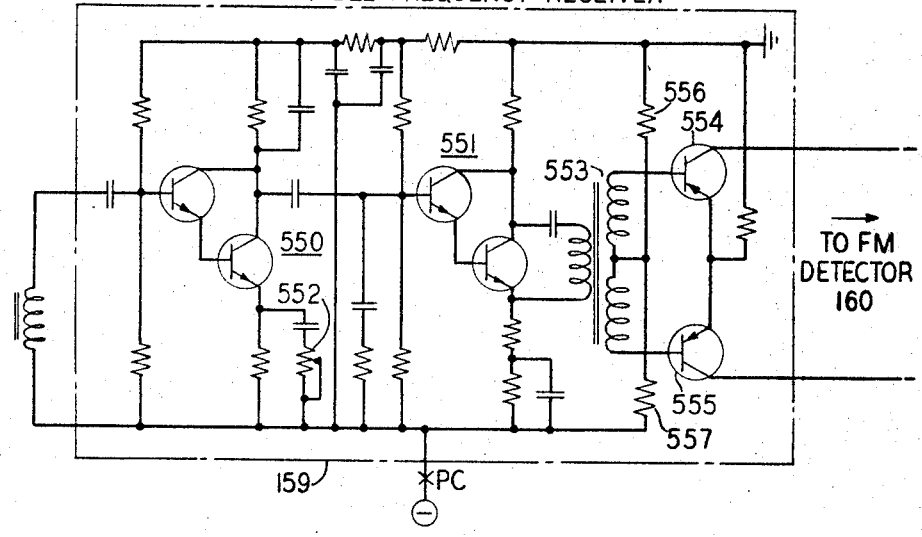
FIG. 11 is a detailed circuit diagram of the variable frequency receiver shown in FIG. 2.

In FIG. 11 there is shown a detailed circuit diagram of the variable frequency receiver 159 shown in block form in FIG. 2. This receiver amplifies the frequency-modulated signals representing the amplitude of the direct current level in the local loop at the far end central office. Variable frequency receiver 159 is a two-stage RC coupled amplifier employing two stages 550 and 551, each employing two transistors connected in a Darlington configuration, thus obtaining high input impedances and hence low interstage losses. Potentiometer 552 controls the gain of this amplifier by varying the emitter feedback in stage 550.

The output of the last stage 551 is coupled by way of transformer 553 to a push-pull stage comprising transistors 554 and 555, resistors 556 and 557, providing base bias for these transistors. As the input wave traverses through zero, transistors 554 and 555 alternately go into saturation.

The output from the collectors of transistors 554 and 555 drive an FM detector which may, for example, be a passive frequency detector utilizing saturable core reactors and having an output current proportional to the input frequency. Basically, a saturating transformer is used which provides a highly accurate volt-second limiting action. On the first half of an input cycle, the core is saturated to its maximum flux condition. The second half of each input cycle then drives the core to its maximum flux condition in the opposite direction. A pulse of constant volt-second area is supported for each half cycle up to saturation. Once the transformer core saturates, however, no voltage is supported until the core is reset by driving it in the opposite polarity. Therefore, as the frequency of the driving voltage is increased, the number of fixed area pulses developed per unit time increases proportionately. These pulses, being alternately positive and negative, are subjected to full wave rectification. The output of the FM detector is therefore a series of closely spaced pulses having an average value proportional to the frequency of the driving voltage.

In FIG. 3 there is shown a more detailed block diagram of a near end test trunk circuit such as circuits 114 and 115 in FIG. 1. The near end test trunk circuit of FIG. 3 comprises a test trunk jack 200 (corresponding to jack 117 in FIG. 1) into which the plug 158 of FIG. 2 may be inserted. FIG. 3 also shows conductors 201, 202, and 203 which are the tip, ring and sleeve conductors, respectively, of one appearance on the near end ewitching system 107 of FIG. 1. The tip and ring conductors 201 and 202 are connected to a transformer 204 having two secondary windings. One of these windings is connected directly to test trunk jack 200. The other secondary winding is connected to supervisory signal receiver 205 which, in turn, operates Supervisory relay 206. Sleeve conductor 203 is connected to Sleeve relay 207 in such a manner that a ground appearing on sleeve conductor 203 operates SL relay 207.

A multifrequency code generating circuit 208 is connected across the secondary winding of transformer 209. The primary winding of transformer 209 is connected directly across the first one of the secondary windings of transformer 204. A plurality of control relays 210 through 214 is also provided in the near end test trunk circuit of FIG. 3 and is used in the manner to be hereinafter described.

A supervisory lamp 215 and a busy lamp 216 are likewise provided in the near end test trunk circuit of FIG. 3 for the purpose of indicating certain conditions for the attendant personnel. The detailed operation of the near end test circuit of FIG. 3 will be described more fully hereinafter in connection with the description of the overall operation of the system.

Figure 10:
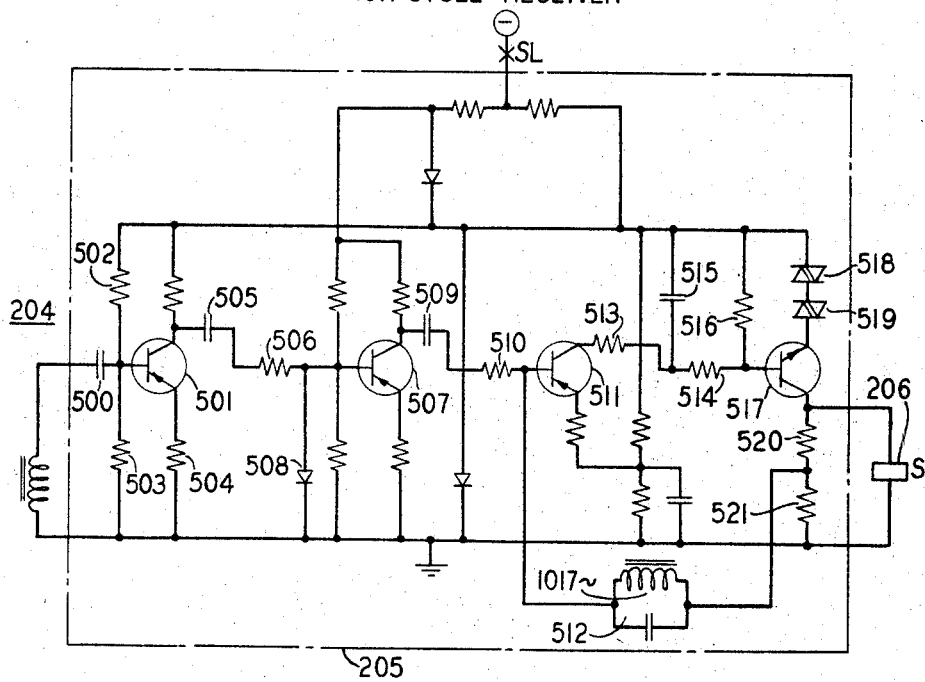
FIG. 10 is a detailed circuit diagram of the 1017 cycle receiving circuit shown in FIG. 3.

In FIG. 10 there is shown a detailed circuit diagram of the supervisory receiver 205, shown in block form in FIG. 3. The supervisory receiver 205 in FIG. 10 receives an input signal by way of transformer 204 and, in response to this signal, operates S relay 206. The supervisory receiver is provided so that customer on-hook or off-hook signals can be received even when the plug 158 is removed from jack 200. This receiver is also used for permanent signal release and receiver off-hook tone supervision.

When the supervisory frequency is received, it is fed by way of transformer 204 through capacitor 500 to the base of transistor 501. Resistors 502 and 503 furnish the base bias for transistor 501. Resistor 504 provides an emitter bias and stabilizes the gain of transistor 501. Capacitor 505 and resistor 506 couple the output of transistor 501 to a limiting stage comprising transistor 507 and associated circuitry. Positive voltages are shunted to ground by diode 508 causing transistor 507 to be cut off. Negative voltages of sufficient amplitude, on the other hand, drive transistor 507 into saturation. The resulting limited output appears as a square wave and is coupled from the collector of transistor 507 by way of capacitor 509 and resistor 510.

The limited output of transistor 507 is connected to a detector comprising transistor 511 and a filter circuit 512. Filter circuit 512 is tuned to the supervisory frequency and, being a parallel resonant circuit, has an appreciable impedance only at the resonant frequency. The emitter of transistor 511 is set at a preselected bias voltage. As the voltage across the tuned circuit 512 swings above and below ground, the negative peaks exceed the bias set at the emitter of transistor 511, and transistor 511 conducts. The collector current of transistor 511 flows through resistor 513, allowing capacitor 515 to charge in a positive direction. During most of the cycle, however, transistor 511 is cut off and capacitor 515 discharges through resistors 514 and 516.

The voltage-dividing action of resistors 514 and 516 presents the capacitor voltage to the base of transistor 517. The emitter of transistor 517 is held at a fixed bias by varistors 518 and 519. When the voltage presented to the base of transistor 517 rises above its emitter voltage, transistor 517 goes into saturation, operating S relay 206. The current through S relay 206 raises the collector voltage of transistor 517. This change in voltage is applied to the voltage divider including resistors 520 and 521. The reduced voltage is fed back through filter circuit 512 to the base of transistor 511 in such a phase as to aid the incoming signal, thus causing a more positive operation of the detector circuit. The feedback signal, by itself, does not exceed the detector threshold.

When the supervisory signal ends, the voltage across filter circuit 512 diminishes until it no longer exceeds the emitter bias of transistor 511. Transistor 511 therefore turns off, allowing capacitor 515 to discharge completely. Transistor 517 then turns off, releasing S relay 206. The receiver is now ready to receive the next supervisory signal.

As previously noted in connection with FIGS. 2 and 3, the operation of S relay 206 is relayed from the near end test trunk circuit by way of a simplex signaling circuit to the near end test circuits to operate S relay 167. This relay, in turn, controls the appropriate operation of the signal lamp 161. In this way, the supervisory state of the line being tested is available as a lamp signal to the testman.

In FIG. 4 there is shown a more detailed circuit diagram of the far end test trunk circuit shown as element 110 in FIG. 1. The circuit of FIG. 4 comprises an incoming "request for service" line 250 which is connected to far end switching system 112 (corresponding to line 111 in FIG. 1), and to which there is assigned the telephone number or numbers to be dialed when access is desired to the remote testing equipment. In the circuits of FIG. 4, line 250 is arranged as a two-party line and assigned two separate numbers. This allows access to the remote testing equipment from two different test locations. To this end, a pair of gas-filled tubes 251 and 252 are connected between the tip and ring conductors, respectively, of line 250, through a respective one of relays 253 and 254, to ground. In operation, a ringing signal with superimposed battery applied between the tip conductor of line 250 and ground breaks down gas tube 251 to operate Ringing Trip-Tip relay 253. Similarly, a ringing signal appearing between the ring conductor 250 and ground breaks down gas tube 252 to operate Ringing Trip-Ring relay 254. The operation of either of relays 253 or 254 operates Dial Tone relay 255 to connect dial tone detector 256 across the outgoing line appearance 257. DT relay 255 also places a ground on lead 269 to the far end test circuit, taking this circuit off-normal and causing line 286 to be bridged by one winding of a hybrid coil 300 (FIG. 5). Line 257 is therefore seized at the far end central office and dial tone placed thereon.

Once the dial tone signal is detected across line 257, dial tone detector 256 causes Start Dial relay 258 to operate, initiating the operation of an automatic repertory dial 259. The repertory dial 259 is of the type into which at least two different telephone numbers may be programmed such that the enablement of the dial by the SD contacts shown will cause the dial to generate the appropriate sequences of dial pulses for calling the required number. This number, of course, corresponds to the originating test station. Such an automatic dial is, for example, shown in the copending application of H. J. Hershey et al., Ser. No. 459,861, filed May 28, 1965.

RTT relay 253 closes an operate path for Transfer relay 260 which, in turn, operates TR contacts 261. Contacts 261, illustrated in FIG. 4 as a single set of transfer contacts, in fact comprises a plurality of such transfer contacts and serves to rearrange the programming of repertory dial 259 to provide for calling a second telephone number. This second telephone number corresponds to a second testing station which may obtain access to the trunk circuit of FIG. 4 by way of the telephone number assigned to the tip conductor of conductors 250.

When repertory dial 259 has completed the generation of the required dial pulse sequences, a signal is applied to the end-of-dialing detector 262 which, in turn, operates Release Dial relay 263. RD relay 263, when operated, releases RTT relay 253 which, in turn, releases DT relay 255 and TR relay 260. DT relay 255, in releasing, releases SD relay 258, while TR relay 260 releases TR contacts 261. The receiving portion of the far end test trunk circuit of FIG. 4 is now returned to normal.

A busy tone signal generator 264 is provided to place a busy tone on line 250 following the establishment of the second connection by way of conductors 257. A time-out timer 265 is also provided to operate Timer relay 266 after a timed interval following the operation of DT relay 255. If the second connection, by way of line 257, is not completed within the time-out period of timer 265, the operation of TM1 relay 266 releases all of the circuits of FIG. 4 and initiates a disconnect signal on lead 270 to FIG. 5, which restores the far end test circuit to normal.

An Answer relay 267 is also provided to register the reception of a confirmation signal from the near end central office, indicating that the second connection, established by way of line 257, has been completed. A more detailed description of the operation of the control circuits of FIG. 4 will be taken up hereinafter in connection with the detailed description of the overall operation of the system.

FIG. 19 is a detailed circuit diagram of the dial tone detector 256 shown in block form in FIG. 4. A dial tone appearing on leads 257 is amplified by transistors 850 and 851. Negative half cycles of this dial tone signal cause diode 852 to conduct and charge capacitor 853 in a negative direction. During the positive half cycles, capacitor 853 discharges through resistor 854. In the continued presence of dial tone signaling, however, the charge on capacitor 853 builds up until the bias on the emitter of transistor 855, supplied by varistor 856, is exceeded. Transistor 855 then goes into saturation, operating SD relay 258.

Contacts 857 on DT relay 255 (FIG. 4) maintain a low impedance discharge path for capacitor 853 until the dial tone detector 256 is connected to line 257 by DT transfer contacts 258 and 259. It can be seen in FIGS. 4 and 19 that SD relay 258 locks to make contacts on DT relay 255.

FIG. 20 is a detailed circuit diagram of the end-of-dialing detector 262 shown in block form in FIG. 4. End-of-dialing detector 262 comprises a transistor 875 having a base-to-emitter resistor 876 supplied through resistor 877 from a negative potential source. The emitter-to-collector path of transistor 875 is by-passed by diode 880.

After the last digit of the number has been generated by the repertory dialing 259 (FIG. 4), the contacts 878 are closed to momentarily drive transistor 875 into saturation. Capacitor 879 is charged to approximately the voltage of breakdown diode 880 during this short end-of-dialing pulse. After the pulse ends, the capacitor 879 discharges through the winding of relay 263, acting as a pulse stretcher to keep current flowing in the winding long enough to operate the relay. RD delay 263 remains operated only momentarily but, in so doing, releases RTT relay 253 or RTR relay 254 (FIG. 4) which, in turn, returns the circuits of FIG. 4 to normal.

In FIG. 5 there is shown the far end test circuit corresponding to circuit 119 in FIG. 1. The incoming line 268 is connected directly to the corresponding line in FIG. 4. In FIG. 5 this line connects to a hybrid circuit 300, one leg of which includes a multifrequency receiver 301 followed by a test relay register 302. The conjugate leg of hybrid 300 has connected thereto a pair of conductors 303 in parallel with a second pair of conductors 304.

The pair of conductors 303 carry frequency-modulated signals which represent the magnitude of a test current supplied from a local subscriber loop. Conductors 304, on the other hand, carry normal speech currents from the local subscriber loop and may be used for monitoring these loops.

In general, multifrequency control signals sent from the near end central office are received by multifrequency receiver 301 and used to operate appropriate relays in test relay register 302. These relays, in turn, set up the appropriate test conditions in test circuit 305, connected between test connection 306 and conductors 304. Test connection 306, of course, is connected, by way of the far end switching system, to the far end subscriber loop.

Currents are induced in the far end subscriber loop as a result of the various test conditions and are applied to variable frequency oscillator 307. Oscillator 307 translates the variable level direct current into a signal the frequency of which varies in a narrow range within the voice frequency band. These frequency-modulated signals are applied, by way of a gate circuit 308, to a low pass filter 309. These signals are then passed through a line amplifier 310 and conductor 303 to hybrid circuit 300. Audio gate 308 serves to block FM signals when multifrequency receiver 301 is receiving a multifrequency code. This prevents the unwanted FM signals from entering receiver 301 by way of hybrid 300.

A supervisory oscillator 311 is connected between low-pass filter 309 and line amplifier 310. Oscillator 311 provides customer line supervision and generates the supervisory signals which are detected by the supervisory receiver 205 in FIG. 3. A plurality of control relays 312 through 316 are also provided for various control functions. These relays, together with other details of the circuit of FIG. 5, will be described hereinafter in connection with the description of the overall operation of the system.

In FIG. 12 there is shown a more detailed block diagram of the multifrequency receiver 301 shown in general block form in FIG. 5. Multifrequency signals are applied to preamplifier 600 and then to three channel separation filters 601, 602, and 603. It will be recalled that each multifrequency code consists of three frequency components. It will be further noted that each component is selected from one of a plurality of mutually exclusive bands of frequency components. This aids in detecting errors in received codes since a correct code must include one, and only one, frequency component from each band.

Returning to FIG. 12, the channel separation filters 601 through 603 separate the received multifrequency code into three bands corresponding to the A, B, and C frequencies generated by multifrequency code generator in FIG. 9. Each of these frequency bands is applied to one of channel amplifiers 604, 605, and 606, respectively. The outputs of the channel amplifiers, in turn, are applied to respective ones of amplitude limiters 607, 608, and 609. Finally, the outputs of limiters 607 through 609 are each applied to a bank of single-frequency detecting circuits 610 through 623. Detectors 610 through 614, of course, detect the "A" frequencies while detectors 615 through 619 detect the "B" frequencies and detectors 620 through 623 detect the "C" frequencies. Each of these detectors is sharply tuned to the corresponding frequency and provides an output only when a signal of that frequency with a substantial amplitude appears at its input. The outputs of detectors 610 through 623 are used to operate corresponding ones of receiver relays 624 through 637.

As previously noted, means are provided to disconnect the output of the variable frequency oscillator 307 (FIG. 5) when the multifrequency receiver of FIG. 12 is in use. To this end, a diode OR gate 638 connects all of the outputs of detectors 610 through 614 to the gate generating circuit 640. Similarly, an OR gate 639 connects the outputs of detectors 620 through 623 to gate generator circuit 640. The simultaneous appearance of signals at these two inputs to gate generator circuit 640 indicates the reception of a valid multifrequency code. Gate generator 640 therefore produces an output on leads 320 to operate audio gate 308 in FIG. 5. Gate generator 640 also operates GT relay 641 which, as can be seen in FIG. 5, disconnects the output of variable frequency oscillator 307 from the transmission line as well as enabling the operate path for the receiving relays 624 through 637. The signal on leads 320 appears almost immediately, while GT relay 641 requires some time to operate. Thus the variable frequency oscillator 307 is immediately disconnected by the electronic gate 308 and thereafter is disconnected by the relay contacts of GT relay 641. The operate path for the receiver relays 624 through 637 is not completed until GT relay 641 operates, along with Off-Normal relay 313 in FIG. 5.

FIG. 15 discloses a detailed circuit diagram of the multifrequency preamplifier 600 shown in block form in FIG. 12. The multifrequency tones applied to this amplifier are generated in the near end test circuit in response to the operation of the various test keys. The incoming signal is coupled by way of transformer 650 to a voltage divider consisting of resistors 651 and 652. Resistor 653 couples the output of the voltage divider to the base of transistor 654. Capacitor 655 reduces the amount of power supply ripple presented to the base of transistor 654. Collector current is supplied to transistor 654 through a coupling network including resistors 656 and 657. Resistor 658 and capacitor 659 provide emitter bias.

Capacitor 660 couples the output of transistor 654 to the base of transistor 661. Transistor 661 also receives its collector current through the decoupling network including resistors 656 and 662. Resistors 663 and 664 provide base bias while resistor 665 and capacitor 666 provide emitter bias.

The output of the second stage comprising transistor 661 is coupled by way of capacitor 667 to the base of transistor 668. Resistors 669 and 670 provide base bias while resistor 671 supplies emitter current. Emitter bias is provided by resistor 672 and capacitor 673 with resistor 674 providing a slight emitter degeneration for stabilizing the gain. Capacitor 675 couples the output of the third stage comprising transistor 668 to the inputs of the channel separation filters 601, 602, and 603 in FIG. 12.

FIG. 16 discloses a detailed circuit diagram of the channel amplifiers, limiters, and single frequency detectors shown in block form in FIG. 12. Thus, the output of each channel separation filter is fed to an amplifier similar to amplifier 700 comprising a transistor 701 having a voltage divider comprising resistors 702 and 703 to furnish proper base bias and to terminate the filter. Resistor 704 supplies the collector current to transistor 701 while resistor 705 provides emitter bias and gain stabilization. Capacitor 706 and resistor 707 couple the output of the amplifying stage to the channel limiter 710.

In the limiting stage 710, diode 711 shunts positive voltages to ground to cause transistor 712 to be cut off. For signal amplitudes within the expected range, negative voltage peaks turn transistor 712 on to provide a square wave voltage output at the input frequency. Capacitor 713 couples this output to five similar detecting circuits, only one of which is shown in FIG. 16. All of these detectors receive their threshold bias from bias supply transistor 721.

Transistor 721 acts as emitter follower, having its base voltage set by a voltage divider comprising resistors 722 and 723. Resistor 724 limits the current flow through transistor 721. With this connection, transistor 721 provides a fixed threshold voltage by way of resistor 725 to the emitter of transistor 726. This threshold voltage is also supplied to detecting stages similar to detector 720 for detecting other frequencies within the same frequency channel.

The output of limiter 710 is applied through resistor 727 to the tuned circuit 728, along with the similar tuned circuits in the other detectors. If the limited signal corresponds in frequency to the resonant frequency of tuned circuit 728, a substantial impedance is presented by the tuned circuit. Other tuned circuits not tuned to the input frequency will develop negligible voltage across their terminals.

Assuming that the input signal is at the resonant frequency of tuned circuit 728, the voltage at the base of transistor 726 produces negative peaks exceeding the bias voltage applied to the emitter of transistor 726. Transistor 726 then conducts, drawing current through resistor 729 to charge capacitor 730. During most of the cycle, however, transistor 726 is cut off and transistor 730 discharges through resistors 731 and 732. The voltage across capacitor 730 is therefore presented to the base of transistor 733 through the voltage dividing action.

When the voltage on the base of transistor 733 exceeds the bias provided by varistors 734, transistor 733 turns on and its collector voltage goes from zero potential toward the supply voltage. This voltage change is supplied across a divider comprising resistors 735 and 736, the midpoint of which is fed back to tuned circuit 728. This regenerative feedback aids the input signal, causing a more positive operation of the detector. It cannot, of course, by itself exceed the detector threshold. The voltage on the collector of transistor 733 is also applied to the appropriate receiving relay. This relay operates in response to the appearance of the corresponding frequency at the detector input.

When the input signal ends, the voltage on the tuned circuit 728 diminishes until it no longer exceeds the bias threshold on the emitter of transistor 726. This allows capacitor 730 to discharge completely through resistors 731 and 732, removing the base voltage from transistor 733. Transistor 733 therefore turns off, returning its collector electrode to ground potential. The feedback signal to tuned circuit 728 is therefore removed and the receiving relay releases.

All of the detectors 610 through 625 in FIG. 12 are essentially identical to detector 720 shown in FIG. 16 with the single exception that each is sensitive to a different nominal frequency due to the tuning of the tuned circuits corresponding to circuit 728.

FIG. 17 discloses a detailed circuit diagram of the gate generator 640 shown in block form in FIG. 12. If a negative voltage is applied to any one of the diodes of OR gate 638 (FIG. 12), the output lead 750 of this gate will become negative. Likewise, when any one or more of the diodes 639 (FIG. 12) has a negative voltage applied thereto, this negative voltage will appear on input lead 751 to gate generator 640. When the negative voltage on both of leads 750 and 751 exceeds the hold-off bias supplied by varistor 752 to the emitter of transistor 753, the transistors 753 and 754 both will turn on. These transistors therefore provide an AND function.

When either or both of transistors 753 and 754 are turned off, the collector voltage of transistor 754 is at the supply potential. This negative voltage holds transistor 756 off while maintaining transistor 755 in saturation. When both transistors 753 and 754 are turned on by negative signals to input leads 750 and 751, the collector voltage of transistor 754 changes to approximately the emitter voltage of transistor 753. This voltage change turns transistor 756 on and transistor 755 off. Transistor 755 going off removes the operating signal supplied to the audio gate 308 (FIG. 5) to close this gate. The variable frequency oscillator 307 is therefore disconnected from the transmission path.

When transistor 756 is turned on, the base of transistor 757 is driven sufficiently negative to turn transistor 757 on and operate GT relay 641. When operated, GT relay 641 opens a short circuit around resistor 758, reducing the current in the relay winding so as to reduce its release time when transistor 757 is later turned off. GT relay 641 also energizes the supply line for the receiving relays 624 through 637 (FIG. 12) and holds open the path between variable frequency oscillator 307 and the transmission line (FIG. 5).

The audio gate function is provided so that when a multifrequency code is detected, the variable frequency oscillator 308 will be immediately cut off. Then, after a suitable delay, GT relay 641 operates to allow the receiving relays to operate. This delay allows any channel in the multifrequency receiver to return to normal if it had been turned on by an output from variable frequency oscillator 308. This delay also helps to minimize talk-off when speech is present.

When the multifrequency code terminates, the gating transistors 753 and 754 of FIG. 17 immediately return to the off condition. The audio gate 308 (FIG. 5) opens immediately but a delay is introduced in the release time of GT relay 641 to eliminate the possibility of the variable frequency oscillator 308 turning on a channel in the multifrequency receiver while the receiving relays are still operated. Registration of false codes are thereby prevented.

In FIG. 18, there is shown a detailed circuit diagram of the supervisory oscillator 311 shown in block form in FIG. 5. This oscillator is adjusted to generate a frequency of 1017 cycles to control the lamp 161 in the near end test circuit (FIG. 2). When it is desired to operate supervisory oscillator 311, an operate path is completed for A relay 800 in a manner to be hereinafter described. In operating, A relay 800 connects capacitor 801 across the secondary winding of transformer 802. A path is also completed for current to flow through resistor 803 and varistor 804 to provide a bias on the base of transistor 805 sufficient to turn this transistor on. Being biased into conduction and having the tuned circuit in its feedback path completed, the oscillating circuit operates to generate the 1017 cycle supervisory tone. The output of this oscillator is coupled by way of capacitor 806 and resistor 807 to the transmission line. The output level is made adjustable by means of potentiometer 808 used with resistor 809 to limit the output level. Capacitor 810 and resistor 811 prevent parasitic oscillations.

FIGS. 13A and 13B, taken together, comprise the test relay register 302 shown in block form in FIG. 5. In general, two relays are provided in FIGS. 13A and 13B for each key shown in FIG. 6. One of these relays is operated when the corresponding key is closed, and the other is operated when the key is opened. Relays responding to the operation of the various keys are shown in the column at the left and identified as operate relays. The relays which operate upon the release of the corresponding keys are shown in the column at the right and are identified as release relays. Thus, relays 900 through 933 are the operate relays while relays 940 through 970 are the release relays.

It will be first noted that no release relay is provided to correspond to Dial relay 900, Dial Pulse relay 901, or Disconnect relay 903. It will be recalled that dial pulsing is accomplished by the continuous presence of two frequencies with the third frequency being interrupted at the dial pulse rate. Upon the initial reception of the three frequencies, DL relay 900 operates and locks to DLP relay 1062 (FIG. 14C). Dial Pulse relay 901, however, follows the dial pulses and is used to repeat these dial pulses into the far end switching system 112 shown in FIG. 1.

DIS relay 903, on the other hand, responds to the initiation of a disconnect signal from the multifrequency code generator 208 in FIG. 3 and causes the entire far end testing circuit to release to normal. A release indication for this signal is therefore not required.

Each of relays 900 through 933 and 940 through 970 operates in response to the simultaneous operation of three of the receiving relays 624 through 637 in FIG. 12. More specifically, each of the relays of FIGS. 13A and 13B responds to the operation of a unique combination of A, B, and C receiving relays. These combinations can easily be seen from make contact arrangements in their operate paths and are noted in Table II. Moreover, each of the operate relays 900 through 933, which with a release relay is associated, locks to break contacts of the respective release relay. The lock path of these relays also includes make contacts on ON1 relay 314 (FIG. 5). A few of the locking paths include contacts of various other relays and will be taken up in detail in connection with the detailed description of their operation.

Finally, it will be noted that ANS relay 267 (FIG. 4) is operated by the same received code as operates ST relay 905. This code is generated when PC relay 165 (FIG. 2) operates in response to the insertion of the plug 158 into the test trunk jack 200. This therefore comprises the confirmation signal indicating the completion of the second connection from the far end test circuits initiated by the repertory dialer.

It will be further noted that DIS relay 903 may also be operated by a ground on DIS lead 270 in FIG. 4, supplied when TM1 relay 266 operates to indicate a time-out on the operation of the repertory dialer. As previously noted, this time-out disconnects all the remote testing circuits, restoring them to normal.

In FIGS. 14, 14B, and 14C there are shown the detailed circuit diagrams of the test circuits 305 shown in block form in FIG. 5. These test circuits actually set up the tests initiated by the operation of the control keys at the near end test circuit and supply the appropriate test conditions to the local subscriber loops.

The monitor test circuit 1000 shown in FIG. 14A, for example, responds to the operation of M key 364 in FIG. 6 to insert bridging amplifier 1001 into the local subscriber loop. The testman at the near end test circuits may then monitor the local subscriber loop to see if it is in use.

At the ground test circuit 1002, a make contact on G relay 916 (FIG. 13A) responds to the operation of G key 376 in FIG. 6 to supply a ground to the tip conductor of the local subscriber loop.

In the station ringer test circuit 1003, the operation of SSRT key 374 (FIG. 6) bridges the ringing supply 1004 onto the local subscriber loop to provide ringing signals to the subscriber. At the same time, an inductor 1005 connects the ring conductor of the local subscriber loop to the negative side of the meter circuit, thus allowing the testman to monitor the voltage on the local subscriber loop during the ringing test. As was noted, in connection with FIG. 5, the meter circuit voltage is applied to the variable frequency oscillator 307 to frequency modulate the oscillator output. This output is then transmitted to the near end test circuits and detected by FM detector 160 (FIG. 2) to operate the meter circuit 151.

In certain types of party line arrangements, the ringer is connected to one of the conductors of a local subscriber loop through a gas tube. These ringers are therefore operated by superimposing a large direct current voltage on the ringing signal. If the direct current voltage is of the proper polarity, the gas tube breaks down, allowing the ringer to operate. In the absence of the superimposed battery or in the presence of a superimposed voltage of opposite polarity, the ringer circuit will not operate.

In FIG. 14A, the tube-type station ringer test circuit 1006 is provided to test these tube-type ringing circuits. In response to the operations of +STA key 372 or −STA key 373, STA relay 1007 operates to connect the ring conductor of the local subscriber loop to either a positive voltage source 1008 or a negative voltage source 1009, depending upon which of the aforementioned keys is operated. These voltages are supplied through resistor 1010, shunting the meter circuit. The testman can therefore monitor the resultant line current and estimate the number of ringers connected to the line. The same test can be repeated for the tip conductor of the local subscriber loop by operating REV key 359 in FIG. 6 which, as will be hereinafter noted, interchanges the tip and ring conductors.

The coin relay test circuit 1011 requires that the testman have a helper at the coin station. The coin mechanism of the pay station is initially tripped. The testman then operates either CC key 377 or CR key 378 which, in turn, causes CN relay 1012 to operate. The operation of CN relay 1012 transforms the metering circuit (FIG. 5) from 100,000 ohms to four ohms and transfers the tip and ring conductors of the local subscriber loop to the control of CC relay 927 and CR relay 928 (FIG. 13B). CN relay 1012 is slow to release, allowing time for the subscriber loop to discharge through resistor 1013 and capacitor 1014 before the tip and ring conductors are restored to normal.

If CC key 377 is operated, contacts on CC relay 927 (FIG. 13B) transfer the meter circuit from the test battery to the coin collect voltage supply 1015. The operation of CR key 378, on the other hand, causes CR relay 928 to operate, transferring the meter circuit to the control of coin return voltage supply 1016. As is well known, the selective application of positive and negative potentials to the pay station loop causes the coin collect and coin return relays to operate. The operate current for these relays is monitored by way of the meter circuit.

The foreign potential test circuit 1017 provides means for testing for foreign potentials on the local subscriber loop. In response to the operation of FEMF key 363 (FIG. 6), F relay 908 operates to remove the test battery from the metering circuit and substitute ground. The grounded metering circuit is connected to the ring conductor. The VM REV key 362 may then be operated to control VR relay 913 and adjust the polarity of the metering circuit. Foreign potentials of either polarity may therefore be metered by the test circuit.

In FIG. 14B, there is shown a test battery circuit 1018 which is used to connect standard voltage supplies to the local subscriber loop. Three separate voltage supplies are provided. The usual voltage supply is the 100 volt source 1019 which is utilized for all standard loop measurements and provides a 100 volt scale deflection on the meter circuit 151 (FIG. 2).

For certain tasks, the 50-volt supply 1020 is brought into use by operation of the 60 v. key 361 (FIG. 6) thereby providing a 50-volt scale deflection on the meter circuit 151 (FIG. 2). In order to read the direct current level in the local subscriber loop, a third supply source 1031 is used and, at the same time, a shunting resistor 1022 is connected across the input to the variable frequency oscillator 307 (FIG. 5).

As can be seen in FIG. 14B, operation of the RCCI key 351 (FIG. 6) inserts the meter circuit directly in series with the local subscriber loop. Operation of the T key 365, however, again removes the meter from the local subscriber loop. As can be seen in FIG. 5, the RCCI receiving relay 931 (FIG. 13B) also inserts a resistor 1023 in series with the meter circuit.

The reversing circuit 1024 provides a means for interchanging the tip and ring conductors of a local subscriber loop. Upon operation of REV key 359 (FIG. 6), RV relay 918 (FIG. 13B) operates to reverse the connection of the tip and ring conductors by means of the contacts shown in circuit 1024.

The permanent signal release circuit 1025 is used for far end central offices of the step-by-step type. A line at such an office may have a premanent signal thereon which the testman wishes to release. This is accomplished by operating the PS RLS key 353 (FIG. 6), thus causing PR relay 932 (FIG. 13B) to operate and connect voltage supply 1027 through RL relay 1026 to the tip conductor of the local loop and through resistor 1028 to the ring conductor of the local loop. At the same time, PR relay 932 opens the sleeve lead associated with this loop (FIG. 14C). As can be seen in FIG. 18, PR relay 932 also prepares a path for operating A relay 800.

The direct current signal thus appearing on the test connection causes the far end switching system to connect in a permanent signal release circuit, causing an interrupted ground to appear on the tip conductor of the connection. RL relay 1026 will therefore alternately operate and release causing A relay 800 (FIG. 18) to likewise alternately operate and release. As previously described, the operation of A relay 800 operates the supervisory oscillator 311 and ultimately results in the flashing of lamp 161 in the near end test circuit of FIG. 2. Release of the first selector or connector in the central office thereafter causes the tip conductor to be opened, releasing RL relay 1026 and extinguishing the lamp 161. Release of the PS RLS key 353 (FIG. 6) disconnects RL relay 1026 to restore this circuit to normal.

The subscriber line relay test circuit 1030 is provided to test the operation of the line relay associated with the particular local subscriber loop under test. The testman operates T key 365 and 3WO key 358 (FIG. 6) and listens for the dial tone to be returned on the test connection. T key 365 causes TK relay 921 (FIG. 13B) to operate while 3WO key 358 causes 3WO relay 919 to operate. These two relays bridge inductor 1031 across the test connection. This bridge on the local subscriber loop causes the associated line relay to operate, initiating the application of dial tone to this line.

The line relay test for coin prepaid subsets is identical to that described above except that LRP key 379 (FIG. 6) is also operated to supply ground through inductor 1032 and resistor 1033 to the tip conductor side of inductor 1031. This provides the appropriate bridging impedance to operate the line relay on coin prepaid subset loops.

The testman can apply superimposed ringing current on the local loop by selectively operating +T key 368, +R key 369, −T key 370 and −R key 371 to operate respective ones of +T relay 925, +R relay 926, −T relay 914 and −R relay 915. The operation of +T relay 925 or −T relay 914 causes TRG relay 1034 to operate, while operation of +R relay 926, −R relay 915 or TRG relay 1034 causes RC relay 1035 to operate. RC relay 1035 connects the ringing supply circuit to the local subscriber loops through transfer contacts 1036 and 1037. TRG relay 1034 transfers ringing ground 1041 through TP relay 1038 from the tip conductor to the ring conductor. The particular ringing supply connected and the conductor to which it is connected depends upon which of the control keys 368 through 371 was operated. When the called station answers the ringing signal, TP relay operates, opening the locking paths for relays 914, 915, 925, and 926 in FIG. 13. When the operated one of these relays releases, RC relay 1035 also releases, disconnecting the ringing supply circuit from the local loop.

In FIG. 14C, there is shown the receiver off-hook tone test circuit 1045. The testman may apply the receiver off-hook tone to the local subscriber loop by operating H key 367 (FIG. 6) which causes the operation of H relay 907 (FIG. 13A). H relay 907, in operating, connects S relay 1046 across the subscriber loop. S relay 1046 operates from the central office battery and completes the operate path for H1 relay 1047 while interrupting the operate path for H2 relay 1048. H1 relay 1047, in operating, locks to the transfer contacts of S relay 1046 and connects the receiver off-hook tone source 1049 to transformer 1050 to apply the off-hook tone to the local subscriber loop. H1 relay 1047 also provides a ground on lead 1051 to tone source 1049 to start an internal timing circuit in this source. The receiver off-hook tone automatically ceases after the timed interval.

If the subscriber on the local loop goes on-hook while the off-hook tone is being applied, S relay 1046 releases, releasing H1 relay 1047 and causing H2 relay 1048 to operate. As can be seen in FIG. 18, the release of S relay 1046 while H relay 907 remains operated causes A relay 800 to operate and give a lamp signal at the local test desk. H2 relay 1048 remains operated until H key 367 is released, releasing H relay 907.

The dial repeating circuit 1060 is used to repeat dial pulses into the far end switching system. In order to transmit dial pulse signals to the far end switching system, the testman operates dial key 350 (FIG. 6) which causes a multifrequency code to be transmitted to operate DL relay 900 (FIG. 13). DL relay 900 operates A relay 800 in the supervisory oscillator of FIG. 18 and connects DS relay 1061 across the local subscriber loop.

At the near end test circuit of FIG. 2, the dial pulse relay 168 is connected in series with the dial circuit 153 such that P relay 168 responds to the dial pulses. As can be seen in FIG. 9, make contacts 464 on P relay 168 interrupt the B frequency at the dial pulse rate. In FIG 13A, DP relay 901 follows these dial pulses and connects DS relay 1061 across the local loop at the dial pulse rate. The bridge formed by DS relay 1061 causes the far end switching system to respond to the dial pulses.

DS relay 1061 does not operate until the far end switching system is prepared to receive dial pulses, indicated by a battery applied between the tip and ring conductors. DS relay 1061, in operating, operates DLP relay 1062 to release A relay 800 in FIG. 18 and thus extinguish the signal lamp 161 in FIG. 2. The testman is now able to begin dialing.

A noted above, when the test desk dial 153 is operated, the dial pulses are transmitted to the far end testing circuits by pulsing the B frequency of multifrequency code generator 154. The other two frequencies, the A and C frequencies, remain on throughout the dialing procedure. DP relay 901 in FIG. 13 responds to these dial pulses and repeats them into the local subscriber loop in dial repeating circuit 1060.

After the completion of dialing, the far end switching system establishes a connection to the subscriber line. At this time, DS relay 1061 releases, releasing DLP relay 1062. DLP relay 1062, in releasing, restores the operate circuit for A relay 800, causing the supervisory lamp 161 to light. At this time, the testman should release DIAL key 350 (FIG. 6 and operate M key 364 to monitor the subscriber loop and insure that this loop is not in use. At this time, the testman may also operate T key 365, resulting in the operation of TK relay 921 in FIG. 13B. As can be seen in FIG. 5, TK relay 921 operates TKM relay 315, removing the shunt 1063 from across the transmitting leg of hybrid coil 300 and connecting repeat coil 1064 to hybrid 300. It will be noted that contacts on TKM relay 315 also disable the variable frequency oscillator 307 to prevent the transmission of frequency modulated signals during talking.

When the connection is established in the above described manner and the line is not busy, M key 364 and T key 365 are released, the bridging resistor 1063 is inserted across the transmitting leg of hybrid coil 300, and transformer 1064 disconnects from hybrid 300. The circuits are now in condition for the performance of any of the tests described above.

If the subscriber line to be tested is in a crossbar office arranged for multifrequency signaling, the testman will operate a KP key to operate KPP relay contacts 366, operating KP relay 386 (FIG. 6) and transmitting a multifrequency code resulting in the operation of KP relay 920 in FIG. 13B. KP relay 920, in operating, bridges KP1 relay 1065 across the tip and ring conductors of the test connection to initiate seizure of that connection in the far end switching system. Contacts on KP relay 920 also operate A relay 800 to send a supervisory tone and light lamp 161. KP relay 920 also operates TKM relay 315 and transfers the sleeve lead of the connected trunk from a high to a low resistance battery to operate a marginal relay in the trunk circuit. TKM relay 315, in operating, disconnects oscillator 307, removes the shunt 1063 from across the transmitting arm of hybrid 300 and connects the test trunk by way of transformer 1064 to this arm.

When the test trunk at the far end switching system is prepared to receive MF pulses, it reverses the polarity on the tip and ring conductors, causing KP1 relay 1065 to operate. In operating, KP1 relay 1065 releases A relay 800, extinguishing the supervisory lamp, and thus indicating to the testman to begin key pulsing.

After the completion of key pulsing, the testman releases KPP key 366, transmitting a multifrequency code to release KP relay 920. KP relay 920, when released, removes KP1 relay 1065 from across the trunk circuit and returns the sleeve potential of the incoming test trunk to a high resistance battery.

Access to the local subscriber loops at the far end switching system is obtained through test trunks at the far end switching system. Several different kinds of test trunks are provided in each central office for access to various types of subscriber loops, to other types of equipment and for connection at various places in the local loop conductors. In FIG. 14C, four such test trunks are disclosed, including non-no-test trunk connection 1070, no-test trunk connection 1071, main distributing frame test trunk connection 1074 and test selector connection 1073. Access to each of these test trunks is obtained by operating the corresponding ones of control keys 354, 355, and 356 for connections 1073, 1071, and 1072, respectively. If none of these keys are operated, the connection is automatically made through the non-no-test trunk connection 1070. Upon the release of any of the special test trunk connections 1071 through 1073, D relay 1074 is caused to operate. Capacitor 1075 makes D relay 1074 slow to release by holding it operated until this capacitor discharges. D relay 1074 therefore remains operated momentarily to apply a negative voltage to the sleeve conductors of each of the test trunk connections. This signal releases the corresponding test trunk equipment, disconnecting them from the far end switching system.

The main distributing frame (MDF) test trunk 1074 allows the testman access not only to the line conductors extending outwardly from the far end office, but also to the tip and ring leads extending inwardly towards the switching equipment. The testman seizes this circuit by operating MDF key 356 (FIG. 6) which, in turn, operates MDF relay 911. This results in connecting of the test connection to the main distributing frame test trunk 1072. The testman may thereafter operate IN key 357, resulting in the operation of IN relay 912. IN relay 912 causes a low resistance battery to be connected to the sleeve of the MDF test trunk connection 1072. This causes the test trunk to split the line so that testing can be done inwardly towards the switching equipment. IN relay 912 also removes the shunt around NP relay 1076 and connects battery to this relay to cause NP relay 1076 to operate. NP relay 1076 opens the high resistance battery path to the sleeve lead. When IN relay 912 is again released, the shunt around the winding of NP relay 1076 causes it to release slowly, allowing a marginal relay in the test trunk to release before the high resistance battery is reconnected to the sleeve conductor.

The testman may also bridge his test connection across the IN and OUT sides of the line by operating 3WO key 358. This results in the operation of 3WO relay 919, opening the sleeve conductor and thereby signaling for the establishment of the bridge.

The testman, by operation of the TTS key 354, operates TS relay 904 to allow the test connection to be made to the test selector connection 1073. With the test selector, the testman is able to selectively connect to various central office equipments for testing purposes.

After testing has been completed on a particular subscriber line at the far end office and the testman desires to test another line at that office, he operates TD key 380, resulting in the operation of TD relay 902. TD relay 902, in operating, opens the tip and ring conductors to the connected test trunk and operates D relay 1074 to initiate the automatic disconnect of the test trunk as described above. When TD key 380 is released, TDR relay 940 operates to release TD relay 902. The circuit is now ready for the testman to establish another connection by means of the dialing sequence described above.

FIG. 21 is a detailed circuit diagram of the variable frequency oscillator 307 shown in block form in FIG. 5. The oscillator of FIG. 21 comprises four basic components including two magnetic amplifiers 1100 and 1101, a transistor inverter circuit 1102 and a transistor oscillator circuit 1103. The meter leads 1104 of FIG. 14A are connected to magnetic amplifier 1100. A variable direct current signal appears on these leads and is applied to the input winding 1105 of the magnetic amplifier 1100.

The DC supply voltage 1106 is converted to a suitable alternating current drive for the magnetic amplifiers 1100 and 1101 by inverter 1102. The output of the inverter circuit 1102, appearing on leads 1107, is applied to the drive windings of magnetic amplifiers 1100 and 1101. This alternating current signal is also rectified and a portion of the rectified output applied to voltage compensation winding 1108. A bias winding 1109 is also provided to make adjustments in the bias. Finally, a feedback winding 1110 is provided to supply a signal proportional to the output frequency. This signal is compensated for temperature changes by means of thermistor 1111.

The output from the drive windings of amplifier 1100 is rectified and applied to the input winding 1112 of magnetic amplifier 1101. This amplifier also has a bias winding 1113. The output signal from the two drive windings is rectified and applied to a detecting circuit comprising resistor 1114 and capacitor 1115. This detector output is then applied as the electrode supply voltage for oscillator 1103. As is well known, the output frequency of a transformer-coupled saturable core oscillator circuit such as oscillator 1103 produces an output frequency proportional to the supply voltage. This output frequency is supplied by way of output winding 1116 and output leads 1117 to the transmission path in the manner illustrated in FIG. 5.

In general then, the operation of the remote subscriber loop testing system disclosed in FIGS. 2 through 5 is as follows. The operation is initiated by the testman at the near end test circuits who utilizes dial circuit 153 (FIG. 2) to call the telephone number assigned to the far end central office test circuits. This call is completed by way of local test circuit 121 and the near end switching system 107 (FIG. 1). Moreover, this connection is established over non-dedicated trunking facilities which at other times may be used for commercial telephone traffic.

Referring to FIG. 4, the telephone number dialed by the testman at the near end office causes the far end switching system 112 (FIG. 1) to provide a ringing signal with superimposed battery on line 250. Depending on the source of this call, ringing signals may appear between the tip conductor and ground or between the ring conductor and ground. This ringing voltage breaks down one of gas tubes 251 or 252, depending on whether the called telephone number is assigned to the tip or ring conductor.

Assuming for the moment that ringing appears between the tip conductor of line 250 and ground, gas tube 251 breaks down to operate RTT relay 253. In operating, RTT relay 253 locks to a local battery. In addition, RTT relay 253 operates make contacts in the operate path of DT relay 255 and operates TR relay 260. DT relay 255, when operated, connects dial tone detector 256 to the outgoing line 257. The bridging of line 268 by ON contacts 321 (FIG. 5) causes the seizure of line 257 at the far end switching office and the application of dial tone to this line. When this dial tone is detected by the detector 256, SD relay 258 operates, locking to make contacts of DT relay 265.

In operating, SD relay 258 operates starting contacts on a repertory dial 259. Meanwhile, TR relay 260 has adjusted the program of repertory dial 259, by the operation of TR contacts 261, such that repertory dial 259 automatically calls the telephone number assigned to the originating test desk.

When repertory dial 259 has completed the pulsing of this telephone number into the far end switching system, end-of-dialing detector 262 is energized to operate RD relay 263. RD relay 263, in operating, releases RTT 253 by way of the break contacts in the operate path of this relay.

The far end test trunk circuit of FIG. 4 must now await the confirmation of the completion of the second connection from the near end central office. DT relay 255, when operated, also initiates a timing cycle in timer 265 and provides a ground on lead 269 to the far end test circuit of FIG. 5. This ground takes the far end test circuit of FIG. 5 off-normal and prepares it for the reception of the above-mentioned confirmation from the near end test desk.

The timer 265 is arranged to operate TM1 relay 266 after the termination of a timed interval, for example, 100 seconds. This interval is a time-out interval for the operation of the repertory dial 259. Should the repertory dial fail to out-pulse the desired number within this time interval, TM1 relay 256 operates to release RTT relay 253 and thence DT relay 255, TR relay 260, and SD relay 258, returning the circuits of FIG. 4 to normal. In addition, TM1 relay 266 provides a ground on lead 270 to the far end test circuit of FIG. 5 to initiate a disconnect of the far end test circuit.

Turning now to FIG. 3, the number called by repertory dial 259 causes the near end switching system to place a ringing signal between conductors 201 and 202. A gas-filled tube 218 breaks down and trips this ringing. At the same time that ringing is applied to conductors 201 and 202, the near end switching system provides a ground on sleeve lead 302 to operate SL relay 207. In operating, SL relay 207 enables supervisory receiver 205 and closes the conductor between supervisory lamp 215 and the flasher contacts 219. The supervisory lamp 215 therefore begins to flash to alert the testman that the connection has been completed from the far end testing circuit.

Turning to FIG. 2, in reply to the flashing of the supervisory lamp of the near end test trunk circuit, the testman inserts plug 158 into test trunk jack 200. When the plug 158 is thus placed in jack 200, an operate path is completed for RT relay 210 (FIG. 3) which operates and provides an operate path for the TC relay 211. TC relay 211, when operated, opens the flashing path for supervisory lamp 215, thus extinguishing this lamp, and also transfers the operate path of RT relay 210 to its own winding. During the interval after TC relay 211 has operated, but before RT relay 210 is released, a pulse of CC-battery is applied over the sleeve lead of jack 200 to the near end test circuit of FIG. 2. This will be taken up hereinafter.

In operating, TC relay 211 also operates H relay 212 which locks to make contacts on SL relay 207. H relay 212, when operated, lights busy lamp 216 and provides a low impedance bridge across line conductors 201 and 202. TC relay 211 also operates PD relay 213 which, when operated, enables multifrequency code generator 208 to send the position disconnect signal. The multifrequency code generator 208, however, is not connected to the line circuit until break contacts of TC relay 211 are closed, indicating that the plug has been removed from the test trunk jack 200.

A disconnect relay 214 is operated by a disconnect key 220 when it is desired to disconnect the remote testing circuits without removing the plug from jack 200. When operated, D relay 214 locks to make contacts on SL relay 207. D relay 214 also enables multifrequency code generator 208 to send a disconnect code to the remote testing circuits. Moreover, make contacts on D relay 214 provide a bridge to connect code generator 208 to the line.

Returning to FIG. 2, the pulse of CC– battery on the sleeve of jack 200 operates SL relay 163 in the near end test circuits of FIG. 2. SL relay 163, when operated, completes an operate path for SL1 relay 164. When the pulse of CC– battery terminates, SL relay 163 releases to complete the operate path for RT relay 162. RT relay 162 transfers the sleeve conductor from SL relay 163 to its own winding and remains operated as long as plug 158 remains in jack 200.

In operating, RT relay 162 completes an operate path for PC relay 165. RT relay 162 also transfers the telephone circuit 152 and dial circuit 153 from the local test circuits to plug 158. PC relay 165 enables variable frequency receiver 159 and connects signal lamp 161 to operate and shunt conductors.

In FIG. 3, S relay 206 provides a ground for operating S relay 167 in FIG. 2 over a simplex signaling circuit through plug 158 and jack 200. S relay 167 in FIG. 2 completes an operate path for S1 relay 166. S1 relay 166, together with S relay 167, prepares a shunting path around signal lamp 161.

The operation of PC relay 165 initiates the transmission from multifrequency code generator 154 of the confirmation signal referred to above. This signal is transmitted by way of the near end test trunk circuit of FIG. 3, the near end switching system, and the far end switching system, over the connection established by the repertory dial, to line 257 in FIG. 4. This code is transferred by way of the far end test circuit of FIG. 5 to the multifrequency receiver 301. Here it is decoded and used to operate ST relay 905 in register 302 and also provide a ground on lead 317. This ground operates Answer relay 267 (FIG. 4). ANS relay 267, when operated, shorts out relays 253 and 254 to prevent another test position from gaining access to the remote testing circuit of FIG. 5. ANS relay 267 also connects busy tone generator 264 (FIG. 4) to line 250 to mark this access line as busy. The circuits are now prepared for use in actual tests.

To this end, the testman operates a DIAL key in key circuits 150 (FIG. 2) along with keys to indicate the test trunks to be used at the far end office 101 (FIG. 1). The testman may then dial the subscriber lines to make the actual connection thereto. Finally, the test keys are operated to set up the desired test conditions.

In the manner described above, tests may be performed on local subscriber loops at the far end central office from a test position located in the near end test central office. All these tests are carried on over the second connection set up by the repertory dial at the far end central office. Since this connection can only be set up between the two central office test positions, unauthorized access to the test circuits is impossible. Thus, the arrangement permits the use of non-dedicated transmission facilities for testing purposes without the problem of unauthorized access to the circuits. Such an arrangement greatly reduces the cost of testing facilities and, moreover, allows the economical concentration of attended test positions at a few centrally located places. This security call-back feature is disclosed and claimed in the copending application of J. A. Cotner, Ser. No. 459,389, filed of even date herewith.

FIG. 22 is a simplified circuit diagram of the prior art arrangement for the ballistic tests of subscriber ringer circuit. A voltage is applied to the local loop and the buildup of charge on the ringer capacitor detected by the current decay in the loop.

FIG. 23 is a simplified circuit diagram of the same test utilizing the arrangements of the present invention. The operation of this test arrangement is readily apparent from the drawing.

It is to be understood that the above-described arrangements are merely illustrative of the numerous and varied other arrangements which may constitute applications of the principles of the invention. Such other arrangements may readily be devised by those skilled in the art without departing from the spirit or scope of this invention.

What is claimed is:

1. A remote indicating system for telephone subscriber direct current loop tests comprising a test station, means at said test station for establishing a connection to a remotely located subscriber loop position, means at said test station for generating multifrequency control signals for transmission over said connection, means at said subscriber loop position responsive to said control signals for applying direct current loop test conditions to a selected one of said subscriber loops, means for translating direct current signals in said selected loop into alternating current signals for transmission over said connection, and means at said test station responsive to said alternating current signals for indicating said direct current signal magnitudes.

2. The remote indicating system according to claim 1 further including means at said test station for requesting a plurality of said direct current loop test conditions, means for selecting said requests one at a time for preselected time interval, and means responsive to said selecting means for generating a unique one of said multifrequency control signals for said preselected interval.

3. The remote indicating system according to claim 2 wherein said selecting means comprises a plurality of negative resistance devices with one terminal of each connected to one side of a common voltage source through a common load impedance, said requesting means comprising means for selectively connecting the other terminals of said negative resistance devices to the remaining side of said voltage source.

4. A remote testing system comprising a controlling station and a controlled station, means including a telephone calling device at each of said stations for extending a transmission link between said stations, control means at said controlling station for requesting a plurality of test functions, means for automatically selecting, encoding, and transmitting said requests to said controlled station, means at said controlled station for automatically decoding said requests and operating testing apparatus in accordance with preselected test functions assigned to said request, and means for automatically transmitting to said controlling station indications of the test conditions at said controlled station.

5. The remote testing system according to claim 4 wherein said means for encoding said requests comprises a multifrequency pulse code generator providing frequency-coded pulses in the voice frequency range.

6. The remote testing system according to claim 4 wherein said indication transmitting means comprises means for translating said indications of said test conditions into frequency modulated signals in the voice frequency range.

No references cited.

KATHLEEN H. CLAFFY, *Primary Examiner.*

A. McGILL, *Assistant Examiner.*